(12) United States Patent
Shike

(10) Patent No.: US 10,275,843 B2
(45) Date of Patent: Apr. 30, 2019

(54) CONSTRUCTION PLANNING SYSTEM

(71) Applicant: Komatsu Ltd., Tokyo (JP)

(72) Inventor: Chikashi Shike, Tokyo (JP)

(73) Assignee: Komatsu Ltd., Tokyo (JP)

( * ) Notice: Subject to any disclaimer, the term of this patent is extended or adjusted under 35 U.S.C. 154(b) by 529 days.

(21) Appl. No.: 14/930,980

(22) Filed: Nov. 3, 2015

(65) Prior Publication Data

US 2016/0321763 A1 Nov. 3, 2016

(30) Foreign Application Priority Data

Apr. 28, 2015 (JP) ................................. 2015-092395

(51) Int. Cl.
*G06Q 50/08* (2012.01)
*G06Q 10/06* (2012.01)

(52) U.S. Cl.
CPC ....... *G06Q 50/08* (2013.01); *G06Q 10/06313* (2013.01)

(58) Field of Classification Search
CPC ......... G06Q 10/00; G06Q 40/00; G06F 17/60
USPC .............................................. 705/7.11, 7.23
See application file for complete search history.

(56) References Cited

U.S. PATENT DOCUMENTS

| | | | | |
|---|---|---|---|---|
| 5,918,219 A * | 6/1999 | Isherwood | ............. | G06Q 10/04 235/378 |
| 6,201,883 B1 * | 3/2001 | Mizui | ...................... | G01C 7/04 348/E13.008 |
| 8,041,647 B2 * | 10/2011 | Clater | .................... | G06Q 10/06 705/301 |
| 8,095,346 B2 | 1/2012 | Fukuda et al. | | |
| 8,121,820 B2 * | 2/2012 | Walch | ................. | G06F 17/5004 703/1 |
| 8,195,682 B2 * | 6/2012 | Fein | ..................... | G06Q 10/063 705/7.11 |

(Continued)

FOREIGN PATENT DOCUMENTS

| | | |
|---|---|---|
| JP | 09-177321 A | 7/1997 |
| JP | 2002-121775 A | 4/2002 |

(Continued)

OTHER PUBLICATIONS

"An integrated framework for evaluation of performance of construction projects", Dec. 2009; Conference Paper Quality Management, pp. 1-15.*

(Continued)

*Primary Examiner* — Romain Jeanty
(74) *Attorney, Agent, or Firm* — Locke Lord LLP

(57) ABSTRACT

A construction planning system includes: a current topography data acquisition unit configured to acquire current topography data indicating a current topography of a construction site; a design topography data acquisition unit configured to acquire design topography data indicating a design topography of the construction site; a basic unit data acquisition unit configured to acquire basic unit data indicating conditions of a work machine carrying out a construction in the construction site; a construction plan data calculation unit configured to calculate construction plan data indicating a construction plan of the construction site based on the current topography data, the design topography data, and the basic unit data; and a construction plan data output unit configured to output the construction plan data.

16 Claims, 16 Drawing Sheets

(56) References Cited

U.S. PATENT DOCUMENTS

| | | | |
|---|---|---|---|
| 8,635,100 B2* | 1/2014 | Janssen | G06Q 10/06 705/40 |
| 2002/0123969 A1* | 9/2002 | Foertsch | G06Q 10/06 705/63 |
| 2007/0100760 A1 | 5/2007 | Dawson | |
| 2008/0127041 A1* | 5/2008 | Gura | G06Q 10/06 717/101 |
| 2008/0213565 A1* | 9/2008 | Simpson | B29C 44/12 428/319.1 |
| 2009/0006147 A1* | 1/2009 | Padmanabhan | G06Q 10/06 705/7.22 |
| 2009/0192772 A1 | 7/2009 | Fukuda et al. | |
| 2014/0270380 A1 | 9/2014 | Morin | |
| 2014/0278662 A1* | 9/2014 | Reed | G06Q 10/063118 705/7.17 |
| 2015/0308081 A1 | 10/2015 | Takaura et al. | |
| 2016/0024757 A1 | 1/2016 | Nomura et al. | |

FOREIGN PATENT DOCUMENTS

| | | | |
|---|---|---|---|
| JP | 2002-328022 | 11/2002 | |
| JP | 2008186145 A | 8/2008 | |
| JP | 2009-169777 A | 7/2009 | |
| KR | 10-2009-0015354 A | 2/2009 | |
| KR | 10-2011-0110648 A | 10/2011 | |
| KR | 2012-0004132 A | 1/2012 | |
| KR | 10-2015-0040362 A | 4/2015 | |
| WO | WO-2006086332 A2 * | 8/2006 | G06F 17/5004 |
| WO | 2014192474 A1 | 12/2014 | |

OTHER PUBLICATIONS

Visa "Methods for Automated Civil Construction Production Control", Dec. 12, 2012; Master's thesis, pp. 1-78.*

Visa Hokkanen "Methods for Automated Civil Construction Production Control", Dec. 2012, Tampere University of Applied Sciences, pp. 1-78. (Year: 2012).*

* cited by examiner

440Ap
MESH POINT (Xg, Yg, Zg)

440Bp
MESH POINT (Xg, Yg, Zg)

FIG.9
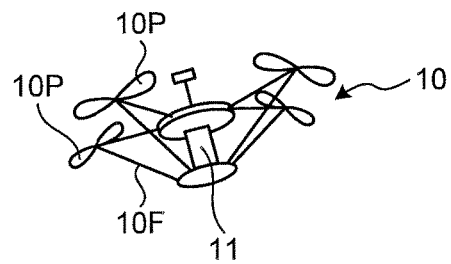
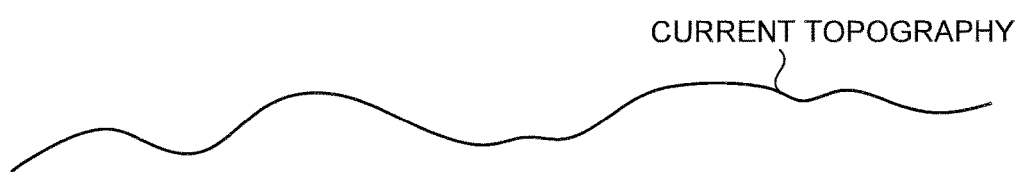

| QUANTITY OF CONSTRUCTION MACHINE AND CONSTRUCTION PERIOD | | BULLDOZER 1<br>EXCAVATOR 1<br>DUMP TRUCK 1 | BULLDOZER 1<br>EXCAVATOR 1<br>DUMP TRUCK 10 | BULLDOZER 1<br>EXCAVATOR 1<br>DUMP TRUCK 20 |
|---|---|---|---|---|
| CONSTRUC-TION SPECIFICATION | CONSTRUC-TION AREA | | | |
| BANK | 2079 m² | 14 H | 14 H | 14 H |
| CUT | 1108 m² | 7.7 H | 7.7 H | 7.7 H |
| CARRY | 971 m² | 249 H | 24.9 H | 15.6 H |
| SLOPE | 830 m² | 3.5 H | 3.5 H | 3.5 H |
| DITCH | 18 m² | 1 H | 1 H | 1 H |

CONSTRUCTION PLANNING SYSTEM

CROSS-REFERENCE TO RELATED APPLICATIONS

The present application claims priority to and incorporates by reference the entire contents of Japanese Patent Application No. 2015-092395 filed in Japan on Apr. 28, 2015.

BACKGROUND OF THE INVENTION

1. Field of the Invention

The present invention relates to a construction planning system.

2. Description of the Related Art

Construction planning at a construction site may be made in a computer system (see Japanese Laid-open Patent Publication No. 09-177321). Further, in recent years, computerized construction has been introduced in construction works. The computerized construction is a system directed for enhancing production performance and securing quality in the total construction production processes by realizing a high-efficiency and high-accuracy construction utilizing electronic information acquired from each process by use of ICT (Information and Communication Technology) and utilizing the electronic information acquired from the construction for other processes in terms of "construction" in the construction production processes including investigation, design, construction, supervision, check, and maintenance management in the construction works. With a construction machine mounting thereon an instrument enabling the computerized construction, it is possible to automatically control the motions of a work machine and to construct in a desired topography.

A shortage of workers in the construction industry is assumed due to the aging of workers in the construction sites and younger people's unwillingness to work in the construction industry. If an optimum construction solution service can be provided, productivity in the construction sites can be enhanced and the issue of the shortage of workers in the construction industry can be solved.

The aspects according to the present invention are directed to provide a construction planning system capable of enhancing productivity in construction sites.

SUMMARY OF THE INVENTION

It is an object of the present invention to at least partially solve the problems in the conventional technology. A construction planning system comprises: a current topography data acquisition unit configured to acquire current topography data indicating a current topography of a construction site; a design topography data acquisition unit configured to acquire design topography data indicating a design topography of the construction site; a basic unit data acquisition unit configured to acquire basic unit data indicating conditions of a work machine carrying out a construction in the construction site; a construction plan data calculation unit configured to calculate construction plan data indicating a construction plan of the construction site based on the current topography data, the design topography data, and the basic unit data; and a construction plan data output unit configured to output the construction plan data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a diagram schematically illustrating a drone according to the present embodiment;

DETAILED DESCRIPTION OF THE PREFERRED EMBODIMENTS

Figure 1:
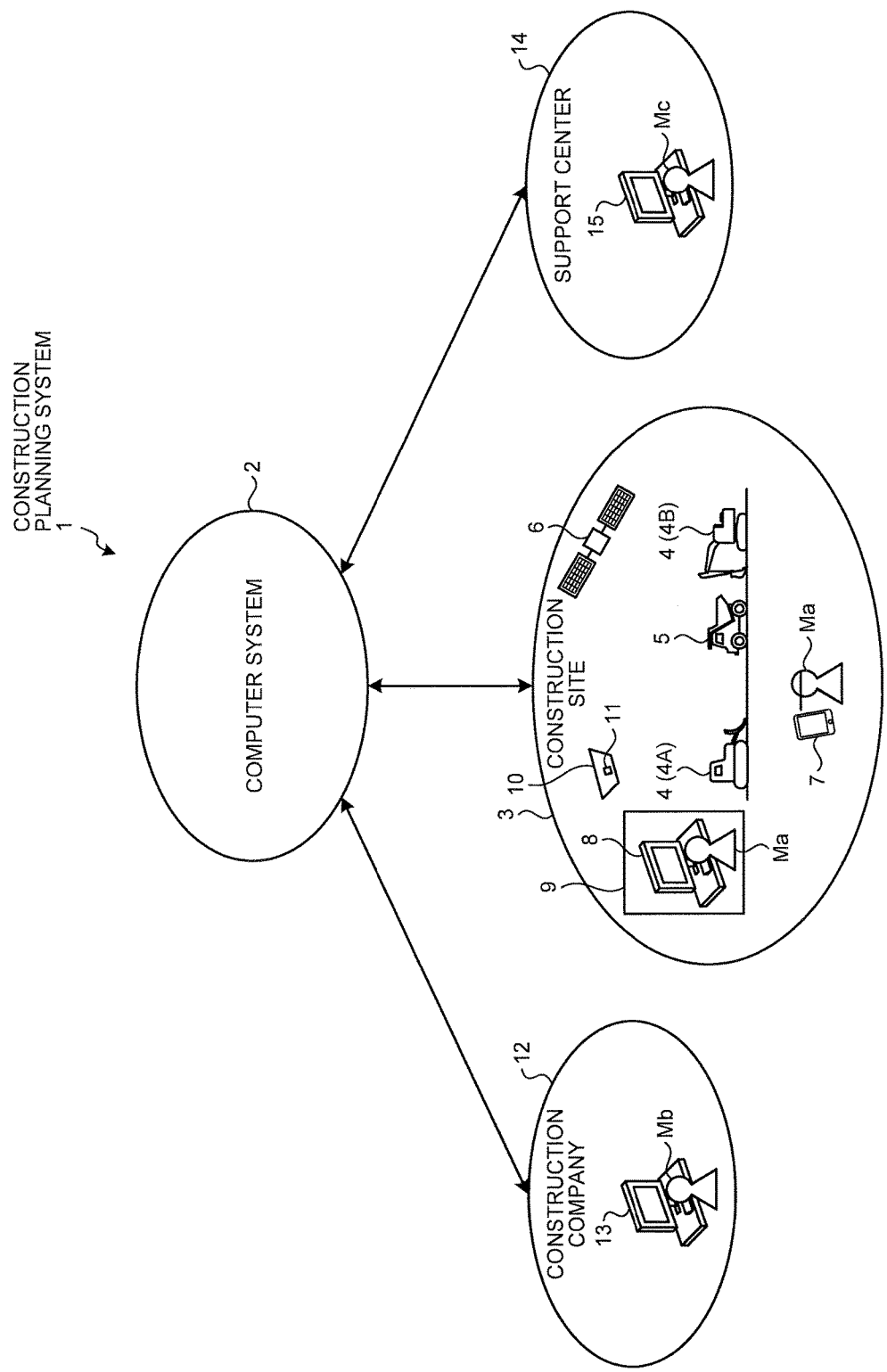
FIG. 1 is a diagram schematically illustrating a construction planning system according to a present embodiment.

An embodiment according to the present invention will be described below with reference to the drawing, but the present invention is not limited thereto. The components according to each embodiment described below may be combined as needed. Additionally, some of the components may not be employed.

Outline of Construction Planning System

FIG. 1 is a diagram schematically illustrating a construction planning system 1 according to the present embodiment. The construction planning system 1 includes a computer system 2 to perform construction planning and construction management for a civil engineering construction site 3. Work machines operate in the construction site 3. The work machines include construction machines 4 capable of cutting and leveling the construction site 3, and a transport vehicle 5 capable of transporting soil, for example.

According to the present embodiment, the construction machines 4 are ICT (Information and Communication Technology) construction machines capable of performing computerized construction, for example. The construction machines 4 include a bulldozer 4A and an excavator 4B each having a working member. The working member is a member having a blade edge and capable of cutting or leveling a current topology of the construction site 3. According to the present embodiment, the working members are a blade provided on the bulldozer 4A and a bucket provided on the excavator 4B. The bulldozer 4A cuts, presses, banks and levels the construction site 3. The excavator 4B cuts, cuts, banks, and levels the same.

The transport vehicle 5 includes a dump truck having a vessel. Soil is loaded on the transport vehicle 5 by the excavator 4B. The transport vehicle 5 transports soil from the construction site 3 to the outside of the construction site 3, and transports soil from the outside of the construction site 3 to the construction site 3.

Further, in the construction site 3, a worker Ma works. The worker Ma owns a portable terminal 7. The portable terminal 7 may be a portable computer such as Smartphone or tablet-type personal computer. A site office 9 is provided in the construction site 3. An information terminal 8 such as personal computer is installed in the site office 9. The worker Ma works by use of the portable terminal 7 or the information terminal 8. The worker Ma may be an operator of the construction machine 4 and a laborer for performing auxiliary works in the construction site 3.

In the construction site 3, a drone 10 configured to detect a current topography of the construction site 3 operates. The drone 10 is an unmanned flight vehicle, and may be a wirelessly remote-operated flight vehicle, or a flight vehicle which automatically floats, flies according to a preset flight route, and descends at a predetermined position. The drone 10 has a camera 11. The drone 10 flies above the construction site 3 while mounting the camera 11 thereon. The camera 11 is a first detector capable of detecting a current topography of the construction site 3 in a non-contact manner. The camera 11 provided on the drone 10 shoots the construction site 3 from the sky, and detects the current topography in a non-contact manner.

The computer system 2 is data-communicable with a construction company 12. A design topography of the construction site 3 is created in the construction company 12. The design topography is a target shape of the ground in the construction site 3. An information terminal 13 such as personal computer is installed in the construction company 12. A worker Mb of the construction company 12 uses the information terminal 13 to create 2D or 3D design topography data.

The construction planning system 1 has a support center 14 configured to support the construction site 3. The computer system 2 is data-communicable with the support center 14. The computer system 2 may be incorporated in the support center 14 and the processings performed in the computer system 2 described later may be performed in the support center 14. The support center 14 changes the design topography needed in the construction site 3, generates 3D image data, and the like. An information terminal 15 such as personal computer is installed in the support center 14. A worker Mc of the support center 14 works by use of the information terminal 15.

Construction Machine

The construction machines 4 will be described below. An absolute position indicating a position of the vehicle main body of the construction machine 4 in a global coordinate system (XgYgZg coordinate system) is detected by a GPS (Global Positioning System) including a GPS satellite 6. A relative position indicating a position of the blade edge of the working member relative to the vehicle main body of the construction machine 4 in a local coordinate system (XYZ coordinate system) is detected by a detector provided in the construction machine 4. An absolute position of the blade edge of the working member is calculated based on the absolute position of the vehicle main body, and the relative position of the blade edge of the working member relative to the vehicle main body.

Figure 2:
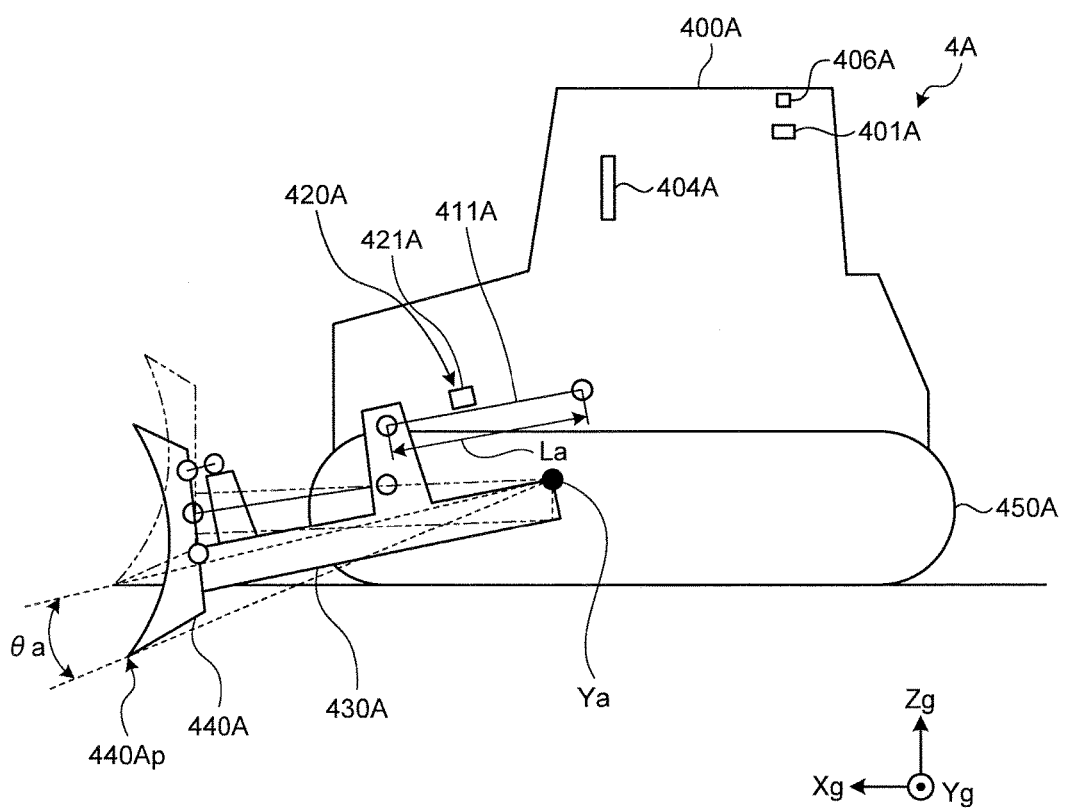
FIG. 2 is a diagram schematically illustrating a bulldozer according to the present embodiment.

FIG. 2 is a diagram schematically illustrating the bulldozer 4A. The bulldozer 4A has a vehicle main body 400A, a GPS receiver 406A configured to detect an absolute position of the vehicle main body 400A, a detector 420A configured to detect a relative position of a blade edge 440Ap of a blade 440A relative to the vehicle main body 400A, and a blade controller 401A configured to control a position of the blade edge 440Ap of the blade 440A.

Further, the bulldozer 4A has a lift cylinder 411A as a hydraulic cylinder, a lift cylinder sensor 421A configured to detect the working amount of the lift cylinder 411A, a lift frame 430A configured to support the blade 440A, and a traveling device 450A configured to support the vehicle main body 400A.

The vehicle main body 400A has an operator's cabin provided with an operator's seat on which the operator sits. The operator's cabin is provided with various operation devices and an output device 404A configured to display image data.

The traveling device 450A has a crawler. The lift frame 430A is supported on the vehicle main body 400A to be operable in the vertical direction about an axial line Ya parallel with the vehicle width direction. The blade 440A is supported on the vehicle main body 400A via the lift frame 430A. The lift cylinder 411A is provided to couple the vehicle main body 400A and the lift frame 430A. The lift cylinder 411A moves the lift frame 430A thereby to move the blade 440A in the vertical direction. The blade edge 440Ap is arranged at the lower end of the blade 440A. The blade edge 440Ap contacts on the ground in the construction site 3 in the leveling work and the cutting work.

The GPS receiver 406A is provided on the vehicle main body 400A. The vehicle main body 400A is provided with a GPS antenna. The GPS antenna outputs a signal corresponding to a radio wave received from the GPS satellite 6 to the GPS receiver 406A. The GPS receiver 406A acquires absolute position data indicating an absolute position of the vehicle. The GPS receiver 406A acquires the absolute position of the vehicle thereby to acquire the absolute position data indicating the absolute position of the vehicle main body 400A.

The detector 420A includes a lift cylinder sensor 421A. The lift cylinder sensor 421A detects lift cylinder length data La indicating a stroke length of the lift cylinder 411A. The blade controller 401A calculates a lift angle θa of the blade 404A based on the lift cylinder length data La. The lift angle θa corresponds to a descend angle from the origin position of the blade 440A, or a depth into the ground or height above the ground of the blade 440Ap. In FIG. 2, the origin positions of the lift frame 430A and the blade 440A are indicated in double-dotted lines. When the lift frame 430A and the blade 440A are positioned at the origin positions, the blade edge 440Ap of the blade 440A contacts on the ground. The bulldozer 4A moves ahead while the blade 440A remains descended from the origin position, so that the leveling work and the cutting work are performed by the bulldozer 4A.

Though not illustrated, the bulldozer 4A may have an angle cylinder capable of moving the blade 440A in the rotational direction (angle direction), a tilt cylinder capable of moving the blade 440A in the rotational direction (tilt direction), an angle cylinder sensor configured to detect angle cylinder length data indicating a stroke length of the angle cylinder, and a tilt cylinder sensor configured to detect tilt cylinder length data indicating a stroke length of the tilt cylinder.

The detector 420A includes an angle cylinder sensor and a tilt cylinder sensor in addition to the lift cylinder sensor 421A. Lift cylinder length data detected by the lift cylinder sensor 421A, angle cylinder length data detected by the angle cylinder sensor, and tilt cylinder length data detected by the tilt cylinder sensor are output to the blade controller 401A. The blade controller 401A calculates a relative position of the blade edge 440Ap of the blade 440A relative to the vehicle main body 400A based on the lift cylinder length data, the angle cylinder length data, and the tilt cylinder length data. The blade controller 401A calculates an absolute position of the blade edge 440Ap of the blade 440A based on the calculated relative position of the blade edge 440Ap of the blade 440A relative to the vehicle main body 400A and the absolute position of the vehicle main body 400A acquired by the GPS receiver 406A.

Figure 3:
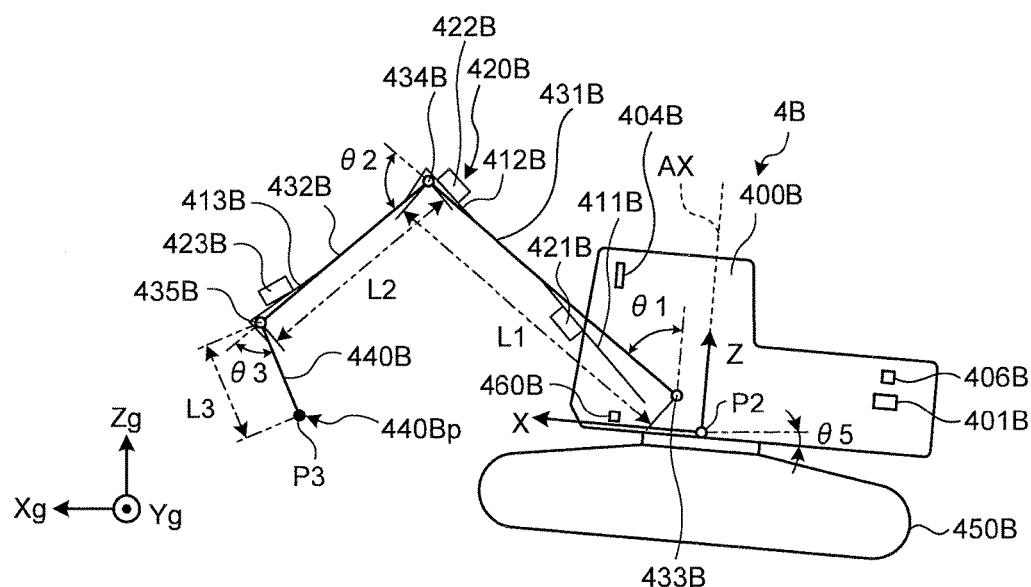
FIG. 3 is a diagram schematically illustrating an excavator according to the present embodiment.
Figure 4:
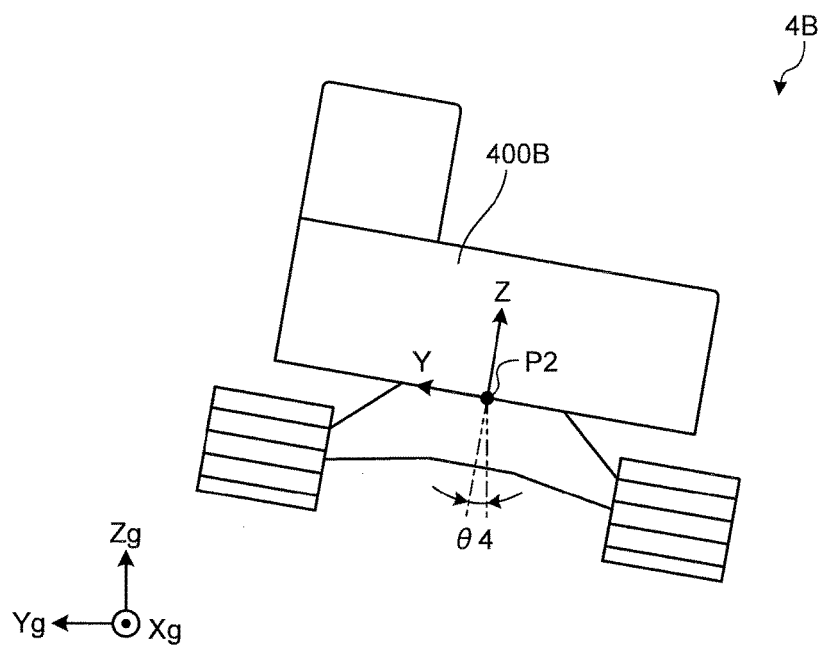
FIG. 4 is a diagram schematically illustrating the excavator according to the present embodiment.

FIG. 3 and FIG. 4 are the diagrams schematically illustrating the excavator 4B. The excavator 4B has a vehicle main body 400B, a GPS receiver 406B configured to detect an absolute position of the vehicle main body 400B, a detector 420B configured to detect a relative position of a blade edge 440Bp of a bucket 440B relative to the vehicle main body 400B, and a bucket controller 401B configured to control a position of the blade edge 440Bp of the bucket 440B.

Further, the excavator 4B has a boom 431B connected to the vehicle main body 400B via a boom pin 433B, and an arm 432B connected to the boom 431B via an arm pin 434B. The bucket 440B is connected to the arm 432B via a bucket pin 435B.

The excavator 4B has a boom cylinder 411B configured to drive the boom 431B, an arm cylinder 412B configured to drive the arm 432B, a bucket cylinder 413B configured to drive the bucket 440B, a boom cylinder stroke sensor 421B configured to detect the working amount of the boom cylinder 411B, an arm cylinder stroke sensor 422B configured to detect the working amount of the arm cylinder 412B, and a bucket cylinder stroke sensor 423B configured to detect the working amount of the bucket cylinder 413B. The boom cylinder 411B, the arm cylinder 412B, and the bucket cylinder 413B are hydraulic cylinders.

The excavator 4B has a traveling device 450B configured to support the vehicle main body 400B, and an IMU (Inertial Measurement Unit) 460B. The vehicle main body 400B is supported by the traveling device 450B. The vehicle main body 400B is an upper swing body capable of swinging about a swing axis AX. The point P2 illustrated in FIG. 3 and FIG. 4 is on the swing axis AX and indicates an origin in the local coordinate system (XYZ coordinate system).

The vehicle main body 400B has an operator's cabin provided with an operator's seat on which the operator sits. The operator's cabin is provided with various operation devices and an output device 404B configured to display image data.

The traveling device 450B has a crawler. The blade edge 440Bp is arranged at the tip end of the bucket 440B. The blade edge 440Bp contacts on the ground in the construction site 3 in the leveling work and the cutting work.

The GPS receiver 406B is provided on the vehicle main body 400B. The vehicle main body 400B is provided with a GPS antenna. The GPS antenna outputs a signal corresponding to a radio wave received from the GPS satellite 6 to the GPS receiver 406B. The GPS receiver 406B acquires absolute position data indicating an absolute position of the vehicle. The GPS receiver 406B acquires the absolute position of the vehicle thereby to acquire the absolute position data indicating the absolute position of the vehicle main body 400B.

The detector 420B includes a boom cylinder stroke sensor 421B, an arm cylinder stroke sensor 422B, and a bucket cylinder stroke sensor 423B. The boom cylinder stroke sensor 421B detects boom cylinder length data indicating a stroke length of the boom cylinder 411B. The arm cylinder stroke sensor 422B detects arm cylinder length data indicating a stroke length of the arm cylinder 412B. The bucket cylinder stroke sensor 423B detects bucket cylinder length data indicating a stroke length of the bucket cylinder 413B.

The bucket controller 401B calculates a tilt angle $\theta 1$ of the boom 431B relative to the vehicle main body 400B in the vertical direction based on the boom cylinder length data. The bucket controller 401B calculates a tilt angle $\theta 2$ of the arm 432B relative to the boom 431B based on the arm cylinder length data. The bucket controller 401B calculates a tilt angle $\theta 3$ of the blade edge 440Bp of the bucket 440B relative to the arm 432B based on the bucket cylinder length data. The bucket controller 401B calculates a relative position of the blade edge 440Bp of the bucket 440B relative to the vehicle main body 400B based on the tilt angle $\theta 1$, the tilt angle $\theta 2$, the tilt angle $\theta 3$, a length L1 of the boom 431B, a length L2 of the arm 432B, and a length L3 of the bucket 440B. The length L1 of the boom 431B is a distance between the boom pin 433B and the arm pin 434B. The length L2 of the arm 432B is a distance between the arm pin 434B and the bucket pin 435B. The length L3 of the bucket 440 is a distance between the bucket pin 435B and the blade edge 440Bp of the bucket 440B.

The IMU 460B is provided on the vehicle main body 400B. The IMU 460B detects a tilt angle $\theta 4$ relative to the vehicle main body 400B in the horizontal direction, and a tilt angle $\theta 5$ relative to the vehicle main body 400B in the front-back direction.

The bucket controller 401B calculates an absolute position of the blade edge 440Bp of the bucket 440B based on the calculated relative position of the blade edge 440Bp of the bucket 440B relative to the vehicle main body 400B and the absolute position of the vehicle main body 400B acquired by the GPS receiver 406B and the IMU 460B.

Figure 5:
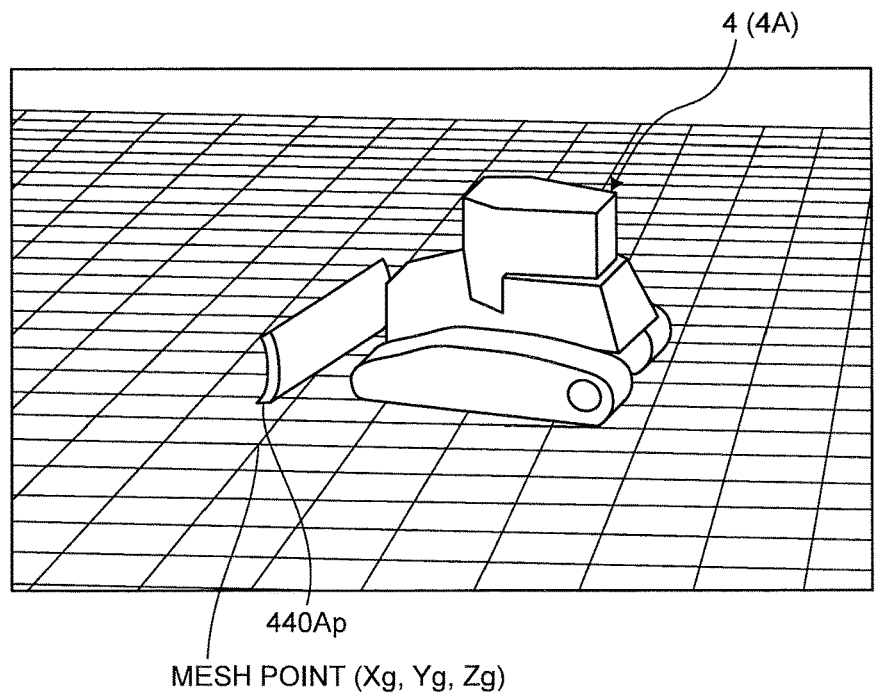
FIG. 5 is a diagram schematically illustrating computerized construction according to the present embodiment.
Figure 6:
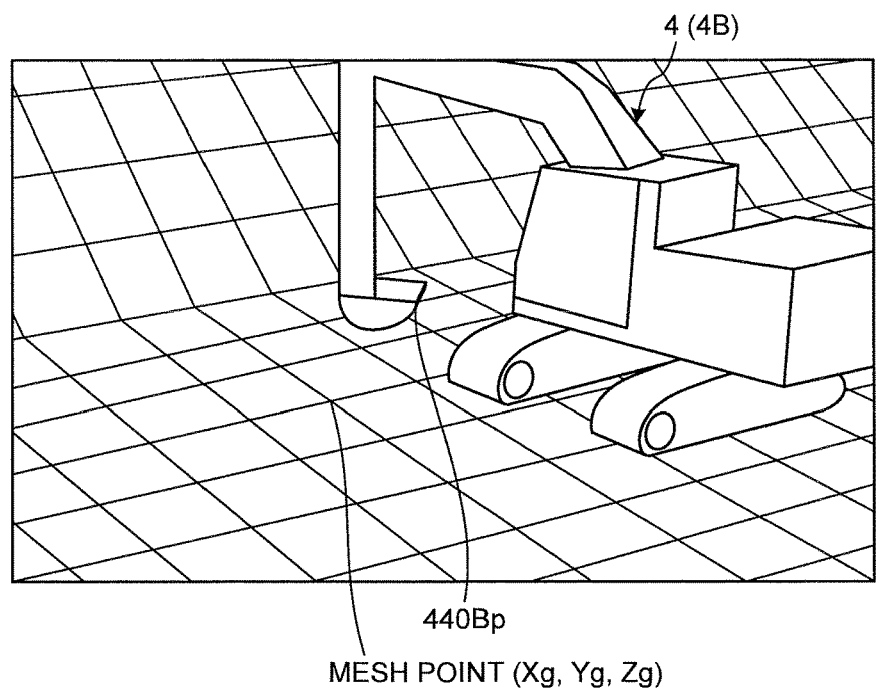
FIG. 6 is a diagram schematically illustrating computerized construction according to the present embodiment.

The construction machine 4 can acquire current topography data indicating a current topography of the ground in the construction site 3. FIG. 5 is a schematic diagram illustrating a state in which the bulldozer 4A acquires current topography data, and FIG. 6 is a schematic diagram illustrating a state in which the excavator 4B acquires current topography data. As illustrated in FIG. 5, a mesh is set on the current topography of the ground in the construction site 3. The bulldozer 4A can detect an absolute position of the blade edge 440Ap (a position in the Xg axis direction, a position in the Yg axis position, and a position in the Zg axis direction). The bulldozer 4A contacts the blade edge 440Ap on a mesh point indicating a cross point of the mesh, thereby acquiring position data at the respective mesh points. Similarly, as illustrated in FIG. 6, the excavator 4B contacts the blade edge 440Bp on a mesh point indicating a cross point of the mesh, thereby acquiring position data at the respective mesh points. The position data at the mesh points, or a trajectory of a blade edge 440p (the blade edge 440Ap, the blade edge 440Bp) is acquired so that the current topography data of the construction site 3 is acquired. When the bulldozer 4A or the excavator 4B drives a crawler track included in a traveling device 450 (450A, 450B) to travel, a trajectory of the position where the crawler track contacts on the ground during traveling (a traveling trajectory of the crawler track) may be found based on the vehicle body dimension information, and the absolute position data indicating the absolute position of the vehicle by a GPS receiver 406 (406A, 406B), thereby acquiring the traveling trajectory of the crawler track as the current topography data of the construction site 3.

Figure 7:
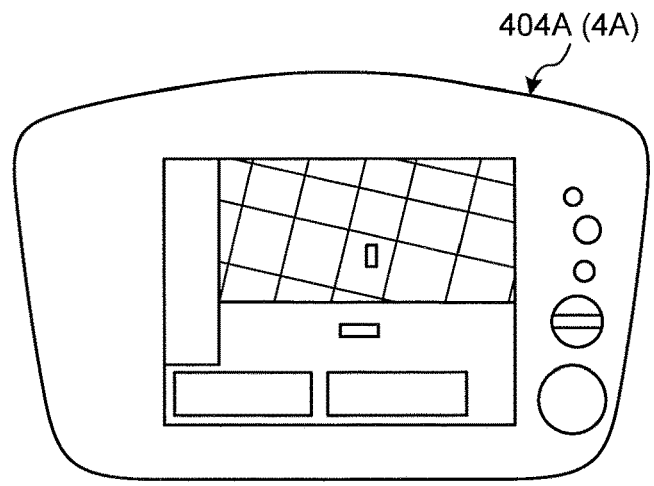
FIG. 7 is a diagram schematically illustrating an output device provided on the bulldozer according to the present embodiment.
Figure 8:
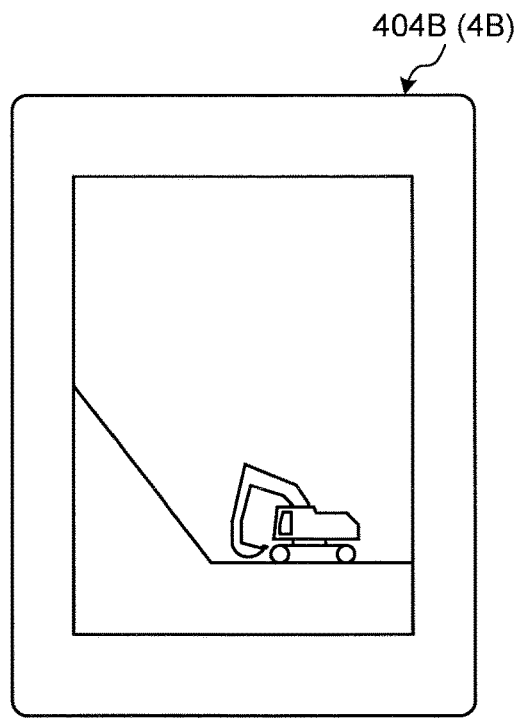
FIG. 8 is a diagram schematically illustrating an output device provided on the excavator according to the present embodiment.

FIG. 7 is a diagram illustrating an example of the output device 404A provided in the operator's cabin of the bulldozer 4A, and FIG. 8 is a diagram illustrating an example of the output device 404B provided in the operator's cabin in the excavator 4B. As illustrated in FIG. 7 and FIG. 8, an output device 404 (the output device 404A, the output device 404B) of the construction machine 4 (the bulldozer 4A, the excavator 4B) includes a display device capable of displaying image data. The design topography data and the construction machine 4 are displayed on the output device 404. The operator of the construction machine 4 can perform the leveling work and the cutting work while viewing the image data displayed on the output device 404.

In this way, the absolute position of a vehicle main body 400 (the vehicle main body 400A, the vehicle main body 400B) of the construction machine 4 (the bulldozer 4A, the excavator 4B) is detected by the GPS including the GPS receiver 406 (406A, 406B) mounted on the vehicle main body 400 and the GPS satellite 6. Further, the construction machine 4 has a detector 420 (the detector 420A, the detector 420B) capable of detecting a relative position of the blade edge 440p (the blade edge 440Ap, the blade edge 440Bp) of the working member 440 (the blade 440A, the bucket 440B) relative to the vehicle main body 400. The construction machine 4 can find an absolute position of the working member 440 based on the absolute position of the vehicle main body 400 and the relative position of the working member 440 relative to the vehicle main body 400. The construction machine 4 is data-communicable with the computer system 2. The design topography data is transmitted from the computer system 2 to the construction machine 4. The construction machine 4 controls the working member 440 such that the blade edge 440p of the working member 440 moves along the design topography based on the design topography data as a target shape of the ground to be cut.

Further, the construction machine 4 can acquire the current topography data of the construction site 3 by use of the blade edge 440p. The construction machine 4 can acquire construction performance data based on the absolute position of the blade edge 440p of the working member 440 in operation. The current topography data or construction performance data acquired by the construction machine 4 is transmitted to the computer system 2.

Drone

FIG. 9 is a diagram schematically illustrating the drone 10. The drone 10 is an unmanned helicopter with a propeller 10P, or an unmanned flight vehicle capable of flying above the construction site 3. The construction site 3 is surveyed by the drone 10. The drone 10 has a frame member 10F, a camera 11 supported on the frame member 10F, and the propeller 10P provided on the frame member 10F. The propeller 10P rotates, and accordingly the drone 10 flies. The camera 11 of the drone 10 shoots the current topography of the construction site 3 from the sky, and stores image data thereof in a storage device 102 described below. Thereafter, the image data is downloaded from the storage device 102 into a ground-based computer, for example, in a wireless or wired manner. The image data downloaded in the computer is converted into 3D current topography data of the construction site 3 by conversion software incorporated in the computer. Thereby, the 3D current topography data is acquired. The conversion software may be stored in the storage device 102 of the drone 10 and the 3D current topography data may be generated by a processor 101 of the drone 10.

Hardware Structure

Figure 10:
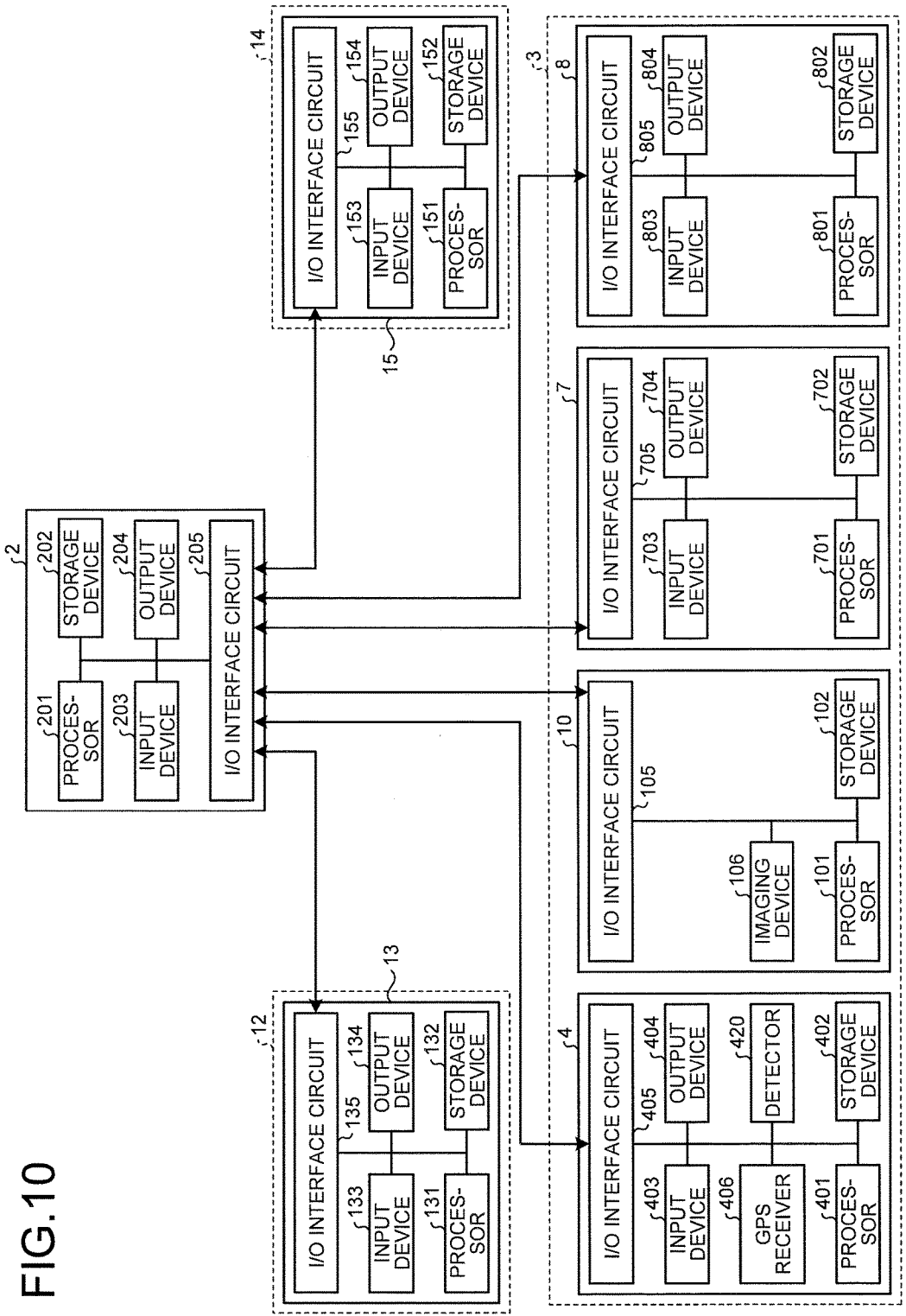
FIG. 10 is a diagram illustrating a hardware structure of the construction planning system according to the present embodiment.

FIG. 10 is a diagram illustrating a hardware structure of the construction planning system 1. The computer system 2 has a processor 201 such as CPU (Central Processing Unit), a storage device 202 including an internal memory such as ROM (Read Only Memory) or RAM (Random Access Memory) and an external memory such as hard disk device, an input device 203 including an input device such as keyboard, mouse and touch panel, an output device 204 including a display device such as flat panel display device and a printer such as inkjet printer, and an I/O interface circuit 205 including a wired communication device or wireless communication device.

The information terminal 13 installed in the construction company 12 has a processor 131, a storage device 132, an input device 133, an output device 134, and an I/O interface circuit 135 including a wired communication device or wireless communication device.

The construction machine 4 operating in the construction site 3 has a processor 401, a storage device 402, an input device 403, the output device 404, the GPS receiver 406, the detector 420, and an I/O interface circuit 405 including a wired communication device or wireless communication device.

The drone 10 operating in the construction site 3 has the processor 101, the storage device 102, an imaging device 106 of the camera 11, and an I/O interface circuit 105 including a wired communication device or wireless communication device.

The portable terminal 7 used in the construction site 3 has a processor 701, a storage device 702, an input device 703, an output device 704, and an I/O interface circuit 705 including a wired communication device or wireless communication device.

The information terminal 8 installed in the construction site 3 has a processor 801, a storage device 802, an input device 803, an output device 804, and an I/O interface circuit 805 including a wired communication device or wireless communication device.

The information terminal 15 installed in the service center 14 has a processor 151, a storage device 152, an input device 153, an output device 154, and an I/O interface circuit 155 including a wired communication device or wireless communication device.

The computer system 2 is data-communicable with the construction machine 4, the transport vehicle 5, the portable terminal 7, the information terminal 8, and the drone 10 in the construction site 3. The portable terminal 7 and the information terminal 8 communicate data with the computer system 2 via Internet. The construction machine 4, the transport vehicle 5, and the drone 10 wirelessly communicate data with the computer system 2 via a communication satellite line or cell phone line. The construction machine 4, the transport vehicle 5, and the drone 10 may wirelessly communicate data with the computer system 2 by use of other communication forms including wireless LAN such as Wi-Fi.

Further, the computer system 2 communicates data with the information terminal 13 in the construction company 12 via Internet. The computer system 2 communicates data with the information terminal 15 in the support center 14 via Internet.

Computer System

Figure 11:
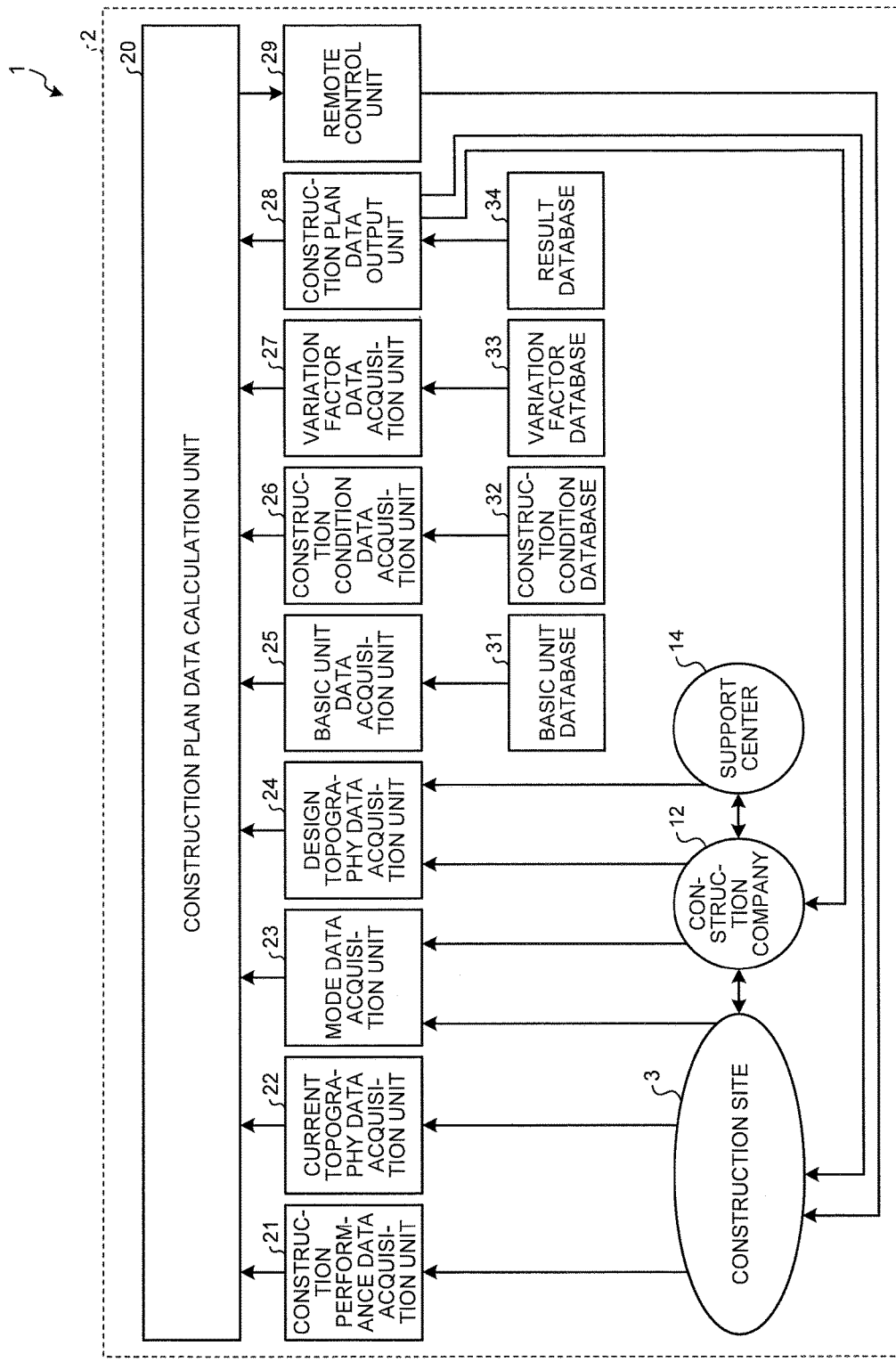
FIG. 11 is a functional block diagram illustrating the construction planning system according to the present embodiment.

FIG. 11 is a functional block diagram illustrating the construction planning system 1. The computer system 2 has a construction plan data calculation unit 20, a construction performance data acquisition unit 21, a current topography data acquisition unit 22, a mode data acquisition unit 23, a design topography data acquisition unit 24, a basic unit data acquisition unit 25, a construction condition data acquisition unit 26, a variation factor data acquisition unit 27, a construction plan data output unit 28, and a remote control unit 29.

Further, the computer system 2 has a basic unit database 31, a construction condition database 32, a variation factor database 33, and a result database 34.

The processor 201 includes the construction plan data calculation unit 20, the construction performance data acquisition unit 21, the current topography data acquisition unit 22, the mode data acquisition unit 23, the design topography data acquisition unit 24, the basic unit data acquisition unit 25, the construction condition data acquisition unit 26, the variation factor data acquisition unit 27, the construction plan data output unit 28, and the remote control unit 29. The storage device 202 includes the basic unit database 31, the construction condition database 32, the variation factor database 33, and the result database 34.

<Current Topography Data Acquisition Unit>

The current topography data acquisition unit 22 acquires current topography data indicating a current topography of the construction site 3. The current topography data is detected by the camera 11 provided on the drone 10. The current topography data acquisition unit 22 wirelessly acquires the current topography data from the camera 11 of the drone 10, for example.

<Design Topography Data Acquisition Unit>

The design topography data acquisition unit 24 acquires design topography data indicating a design topography of the construction site 3. The design topography is created in the construction company 12. The design topography data acquisition unit 24 acquires the design topography data from the information terminal 13 in the construction company 12 via Internet.

<Basic Unit Data Acquisition Unit>

The basic unit data acquisition unit 25 acquires basic unit data indicating conditions of work machine operating in the construction site 3. The basic unit data is stored in the basic unit database 31. The basic unit data acquisition unit 25 acquires the basic unit data from the basic unit database 31.

The conditions of work machine in the basic unit data include at least one of type, rank, and quantity of work machines which are procurable for the construction site 3. The conditions of work machine include management state of procurable work machine.

The conditions of work machine in the basic unit data include the working amount of the work machine executable per unit time. The working amount of the work machine executable per unit time is an index indicating a working capability of the work machine, and refers to the amount of soil movable by the work machine per unit time. The working amount of the work machine executable per unit time is called construction work basic unit. When the work machine is the bulldozer 4A, the working amount of the bulldozer 4A refers to the amount of pressed soil (the amount of soil capable of being pressed) and the amount of banked soil (the amount of bankable soil) executable by the bulldozer 4A per unit time. When the work machine is the excavator 4B, the working amount of the excavator 4B refers to the load amount (the amount loadable on the transport vehicle 5), the amount of cut soil (the cuttable amount), and the amount of banked soil (the amount of bankable soil) executable by the excavator 4B per unit time. When the work machine is the transport vehicle 5, the working amount of the transport vehicle 5 refers to the amount of soil transportable by the transport vehicle 5 per unit time.

The working amount of the construction machine 4 executable per unit time depends on a size of the working member 440. If the size of the working member 440 is larger, the working amount is larger, and if the size of the working member 440 is smaller, the working amount is smaller. Therefore, the working amount of the work machine 4 includes the size of the working member 440. The working amount of the bulldozer 4A includes the size of the blade 440A, and the working amount of the excavator 4B includes the size (bucket capacity) of the bucket 440B.

The basic unit data further includes conditions of workers Ma in the construction site 3. The conditions of workers Ma include the number of workers Ma procurable for the construction site 3. The conditions of workers include skills of procurable workers Ma.

That is, the basic unit data indicates resources required for the construction, such as conditions of work machines and conditions of workers. The basic unit data is known data capable of being acquired before the construction, and is held in the basic unit database 31.

<Construction Condition Data Acquisition Unit>

The construction condition data acquisition unit 26 acquires construction condition data indicating construction conditions of the construction site 3. The construction conditions include items set by the construction company 12. The construction condition data is stored in the construction condition database 32. The construction condition data acquisition unit 26 acquires the construction condition data from the construction condition database 32.

The construction condition data includes at least one of budget, construction period, working contents, working procedure, working time, and site environments for the construction. The site environments include at least one of a topography of the construction site 3 and a size of the construction site 3. The construction condition data is known data set before the construction, and is held in the construction condition database 32.

<Variation Factor Data Acquisition Unit>

The variation factor data acquisition unit 27 acquires variation factor data indicating variation factors in the construction site 3. The variation factor data includes variation factors such as natural environments in the construction site 3, and influences the working efficiency of the construction. The variation factor data is stored in the variation factor database 33. The variation factor data acquisition unit 27 acquires the variation factor data from the variation factor database 33.

The variation factor data includes soil property data indicating type and state of soil in the construction site 3. Further, the variation factor data includes deposit data indicating deposits under the construction site 3. Further, the variation factor data includes meteorological data of the construction site 3. The soil property data and the deposit data are acquired based on a preliminary survey conducted before the construction. The preliminary survey is a boring survey, for example. The meteorological data is acquired from the Japan Meteorological Agency or a meteorological service. The variation factor data acquired before the construction is held in the variation factor database 33.

<Construction Performance Data Acquisition Unit>

The construction performance data acquisition unit 21 acquires construction performance data indicating construction performances of the construction site 3. The construction performance data indicates construction performances performed by the construction machine 4. The construction machine 4 acquires its construction performance data. The construction machine 4 can detect a current topography based on a trajectory of the absolute position of the blade edge 440p of the working member 440 contacting on the current topography or a traveling trajectory of the crawler track. The construction machine 4 compares the current topography detected based on the absolute position of the blade edge 440p with the design topography as a target shape, thereby acquiring the construction performance data indicating how much the work (cutting or filling soil) advances for the design topography. Herein, for example, the computer system 2 may acquire the current topography information from the construction machine 4 and may acquire the construction performance data in comparison with the design topography as a target shape. The construction performance data acquisition unit 21 wirelessly acquires the construction performance data from the construction machine 4, for example.

<Mode Data Acquisition Unit>

The mode data acquisition unit 23 acquires mode data indicating priority items of construction. The mode data will be described below in detail. The priority items of construction are selected by the worker Ma in the construction site 3 or the worker Mb in the construction company 12. The worker Ma operates the input device 703 in the portable terminal 7 or the input device 803 in the information terminal 8 thereby to input priority items of construction. The worker Mb operates the input device 133 in the information terminal 13 thereby to input priority items of construction. The mode data acquisition unit 23 acquires the mode data indicating priority items of construction from at least one of the portable terminal 7, the information terminal 8, and the information terminal 13 via Internet, for example.

The mode data includes at least one of construction period priority mode data giving priority to construction period and cost priority mode data giving priority to construction cost. When wishing to finish the construction earlier, the worker Ma or the worker Mb selects construction period as a priority item of construction, and operates the input device 703, the input device 803, or the input device 133. An input device is operated so that the construction period priority mode data giving priority to construction period is acquired by the mode data acquisition unit 23. On the other hand, when wishing to perform the construction at low cost, the worker Ma or the worker Mb selects cost as a priority item of construction, and operates an input device. An input device is operated so that the cost priority mode data giving priority to construction cost is acquired by the mode data acquisition unit 23.

<Construction Plan Data Calculation Unit>

The construction plan data calculation unit 20 calculates construction plan data 20 indicating a construction plan of the construction site 3 based on the current topography data acquired by the current topography data acquisition unit 22, the design topography data acquired by the design topography data acquisition unit 24, and the basic unit data acquired by the basic unit data acquisition unit 25.

The construction plan data calculation unit 20 collates the current topography data with the design topography data thereby to calculate construction range data indicating a construction range of the construction site 2 and soil amount data indicating the amount of cut or filled soil in the construction range. The construction plan data calculation unit 20 calculates the construction plan data based on the calculated construction range data and soil amount data as well as the basic unit data.

When the construction condition data is acquired by the construction condition data acquisition unit 26, the construction plan data calculation unit 20 calculates the construction plan data based on the current topography data, the design topography data, the basic unit data, and the construction condition data.

When the variation factor data is acquired by the variation factor data acquisition unit 27, the construction plan data calculation unit 20 calculates the construction plan data based on the current topography data, the design topography data, the basic unit data, and the variation factor data.

When the mode data is acquired by the mode data acquisition unit 23, the construction plan data calculation unit 20 calculates the construction plan data based on the current topography data, the design topography data, the basic unit data, and the mode data.

When the construction performance data is acquired by the construction performance data acquisition unit 21, the construction plan data calculation unit 20 recalculates the construction plan data based on the construction performance data.

The construction plan data includes at least one of work machine data indicating type, rank and quantity of work machines used in the construction site 3, progress schedule data indicating a progress schedule of the construction using the work machines, and cost data indicating cost required for the construction. The progress schedule data includes at least one of flow data indicating a construction working procedure, working time data indicating a working time per work of the construction, and construction period data indicating a period until the construction is completed.

<Construction Plan Data Output Unit>

The construction plan data output unit 28 outputs the construction plan data calculated by the construction plan data calculation unit 20. The construction plan data output unit 28 outputs the construction plan data to the result database 34.

Further, the construction plan data output unit 28 transmits the construction plan data calculated by the construction plan data calculation unit 20 to at least one of the portable terminal 7, the information terminal 8 provided in the construction site 3, and the information terminal 13 provided in the construction company 12 via Internet. The output device 704 in the portable terminal 7 and the output device 804 in the information terminal 8 function as a first output device capable of outputting the construction plan data. The output device 704 in the portable terminal 7 and the output device 704 in the information terminal 8 include a display device capable of displaying image data. The output device 704 and the output device 804 include a flat panel display such as a liquid crystal display. The portable terminal 7 and the information terminal 8 convert the construction plan data into image data thereby to display the image data on the output device 704 and the output device 804.

The current topography data acquired by the camera 11 of the drone 10 and the design topography data created in the construction company 12 are transmitted to the portable terminal 7 and the information terminal 8 via the construction plan data calculation unit 20 and the construction plan data output unit 28. The construction plan data calculation unit 20 processes the acquired current topography data and design topography data into 3D image data. That is, the construction plan data calculation unit 20 converts the image data of the current topography acquired by the camera 11 into the 3D image data. Further, the construction plan data calculation unit 20 converts the 2D design topography data as a design diagram created in the construction company 12 or the 3D design topography data into the 3D image data. The construction plan data calculation unit 20 transmits the 3D image data of the current topography data and the design topography data to the portable terminal 7 and the information terminal 8 via the construction plan data output unit 28. The output device 704 in the portable terminal 7 and the output device 804 in the information terminal 8 three-dimensionally display the current topography data and the design topography data.

The construction performance data acquired by the construction machine 4 is transmitted to the portable terminal 7 and the information terminal 8 via the construction plan data calculation unit 20 and the construction plan data output unit 28. The portable terminal 7 and the information terminal 8 function as a second output device capable of outputting the construction performance data. The construction plan data calculation unit 20 processes the construction performance data acquired from the construction machine 4 into 3D image data. That is, the construction plan data calculation unit 20 converts the position data at the mesh points acquired by the construction machine 4 into the 3D image data. The construction plan data calculation unit 20 transmits the construction performance data to the portable terminal 7 and the information terminal 8 via the construction plan data output unit 28. The output device 704 in the portable terminal 7 and the output device 804 in the information terminal 8 three-dimensionally display the construction performance data.

Support Center

The support center 14 can generate the 3D image data which is to be generated by the construction plan data calculation unit 20 in the computer system 2 as described above. That is, the processor 151 in the support center 14, instead of the construction plan data calculation unit 20, processes the construction performance data acquired from the construction machine 4 into the 3D image data or converts the 2D design topography data as a design diagram crated in the construction company 12 or the 3D design topography data into the 3D image data. The generated 3D image data is transmitted to the portable terminal 7 and the information terminal 8 via the output device 154 and the computer system 2.

Further, the support center 14 accepts changes in the design topography needed in the construction site 3. The design topography data indicating a changed design topography is calculated in the support center 14 by use of the information terminal 15. The information terminal 15 transmits the changed design topography data to the computer system 2 via Internet, for example. The design topography data acquisition unit 24 in the computer system 2 acquires the changed design topography data output from the support center 14. The construction plan data calculation unit 20 recalculates the construction plan data based on the changed design topography data.

The changed design topography data is transmitted to the construction machine 4. The working member 440 is controlled based on the changed design topography data.

<Remote Control Unit>

Further, the computer system 2 may have the remote control unit 29 configured to output a control signal for remotely operating the construction machine 4 based on the design topography data. The remote control unit 29 remotely controls the construction machine 4. When the design topography is changed in response to a request from the construction site 3, the remote control unit 29 can output a control signal for remotely controlling the construction machine 4 based on the changed design topography data.

Construction Planning Method

Figure 12:
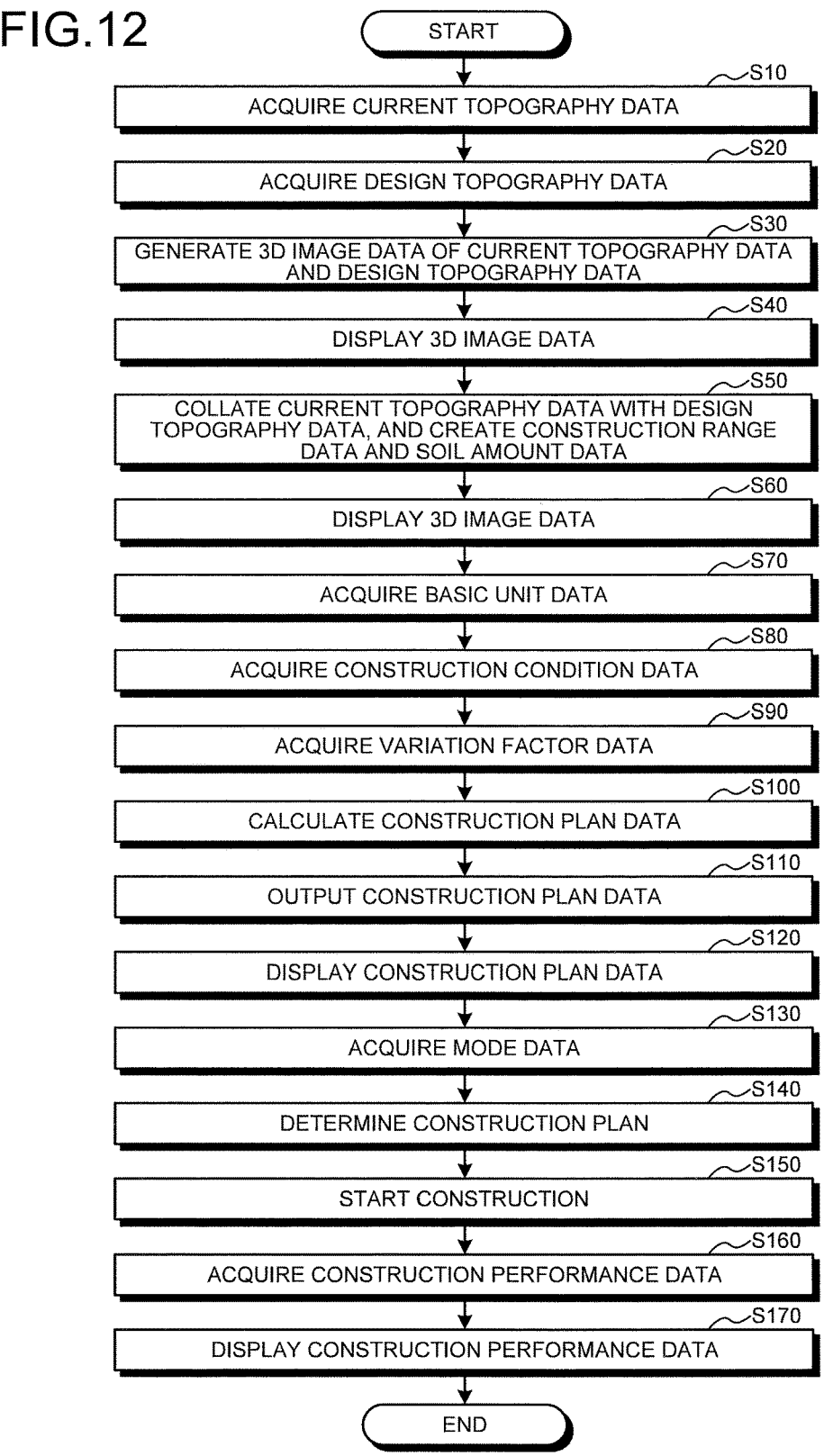
FIG. 12 is a flowchart illustrating a construction planning method according to the present embodiment.

A construction planning method using the construction planning system 1 will be described below. FIG. 12 is a flowchart illustrating the construction planning method.

The construction site 3 is surveyed by use of the drone 10. The camera 11 of the drone 10 acquires 3D current topography data of the construction site 3. The current topography data acquisition unit 22 acquires current topography data from the camera 11 (step S10).

Design topography data is acquired by the design topography data acquisition unit 24 (step S20).

The construction plan data calculation unit 20 generates 3D image data of the current topography data and 3D image data of the design topography data (step S30).

The 3D image data of the current topography data and the 3D image data of the design topography data are transmitted to the portable terminal 7 and the information terminal 8. The 3D image data of the current topography data and the 3D image data of the design topography data are displayed on the output device 704 in the portable terminal 7 and the output device 804 in the information terminal 8 (step S40).

Figure 13:
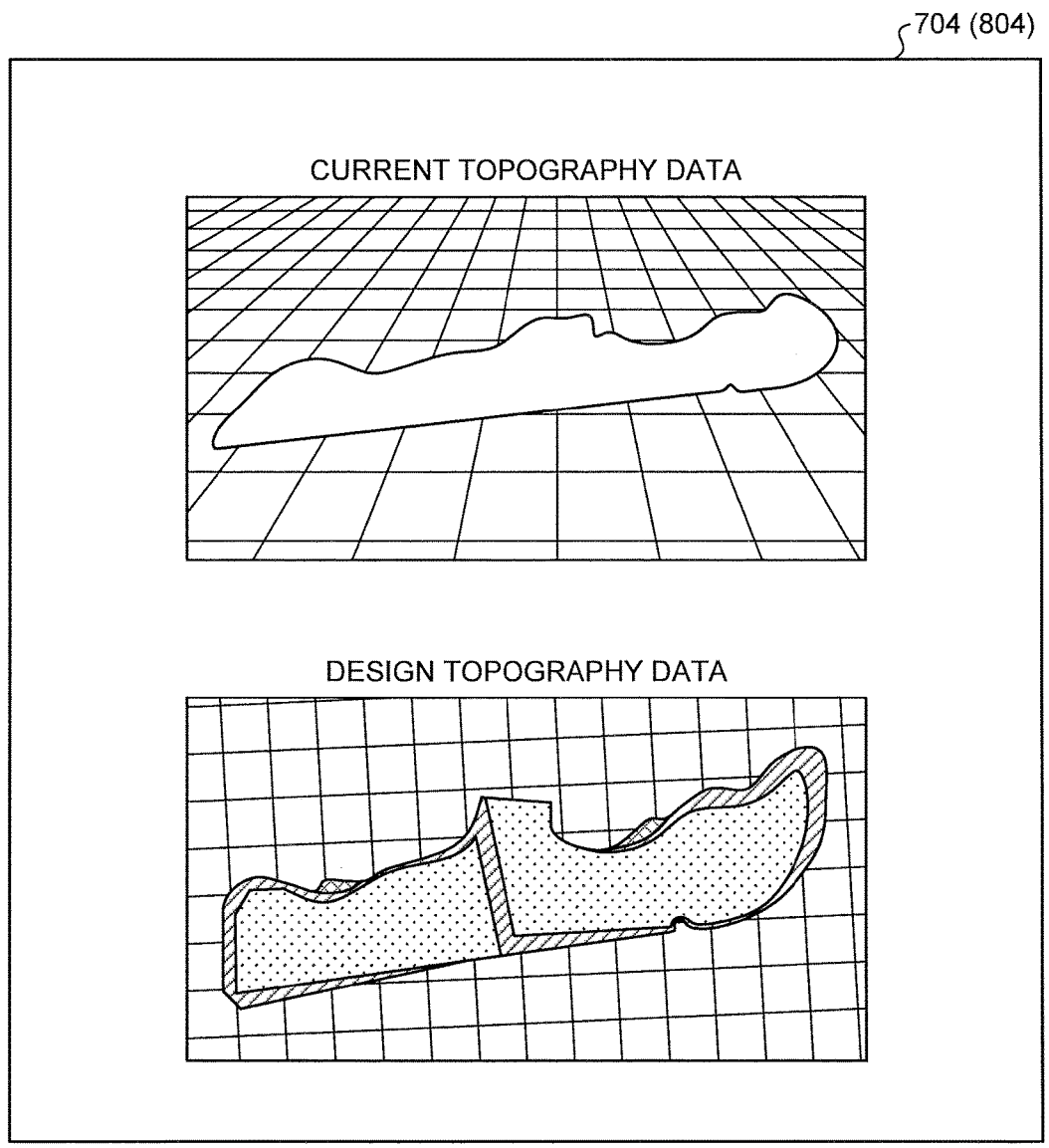
FIG. 13 is a diagram illustrating exemplary output of the output devices according to the present embodiment.

FIG. 13 is a diagram illustrating exemplary display of the 3D image data of the current topography data and the 3D image data of the design topography data on the output device 704 and the output device 804.

The construction plan data calculation unit 20 collates the current topography data with the design topography data thereby to calculate construction range data indicating a construction range of the construction site and soil amount data indicating the amount of soil (the amount of cut or cut soil) cut in the construction range or the amount of filled soil (the amount of banked soil) carried into the construction site (step S50).

The construction plan data calculation unit 20 calculates and transmits the 3D image data of the construction range data and the soil amount data to the portable terminal 7 and the information terminal 8 via the construction plan data output unit 28. The output device 704 in the portable terminal 7 and the output device 804 in the information terminal 8 display the 3D image data of the construction range data and the soil amount data (step S60).

Figure 14:
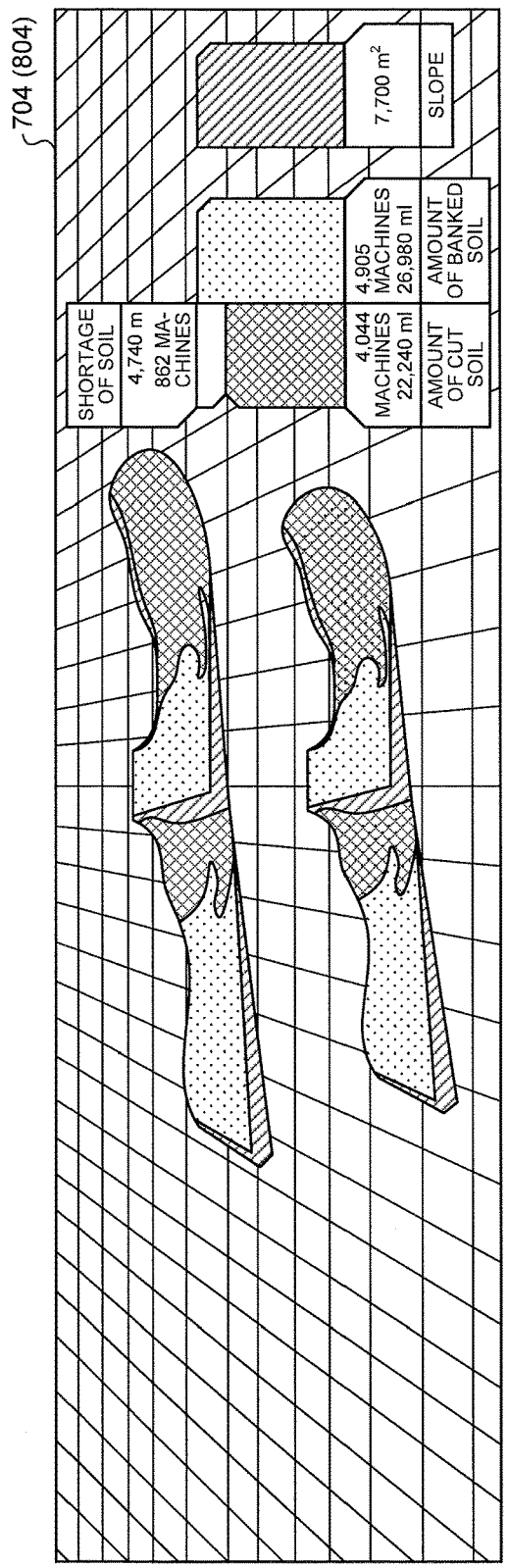
FIG. 14 is a diagram illustrating exemplary output of the output devices according to the present embodiment.

FIG. 14 illustrates exemplary display of the 3D image data of the construction range data and the soil amount data on the output device 704 and the output device 804. As illustrated in FIG. 14, numeric data may be displayed together with the 3D image data. Differences between the current topography data and the design topography data in the 3D image data are visualized in colors or patterns so that the worker or manager can grasp, before the construction, a range to be constructed, and a shape and the like during the construction or after the construction. For example, a construction-completed range may be displayed in blue and a construction-uncompleted range may be displayed in yellow in the 3D topography data. The worker or manager can accurately grasp the amount of cut soil so far, the required amount of cut soil, the amount of banked soil carried, the required amount of carried soil, a size of construction-uncompleted slope area, a size of construction-completed slope area, and the like by the numeric data.

The basic unit data is acquired by the basic unit data acquisition unit 25 (step S70). The construction plan data calculation unit 20 acquiring the basic unit data generates image data of the basic unit data, and displays the image data of the basic unit data on the output device 704 in the portable terminal 7 and the output device 804 in the information terminal 8.

Figure 15:
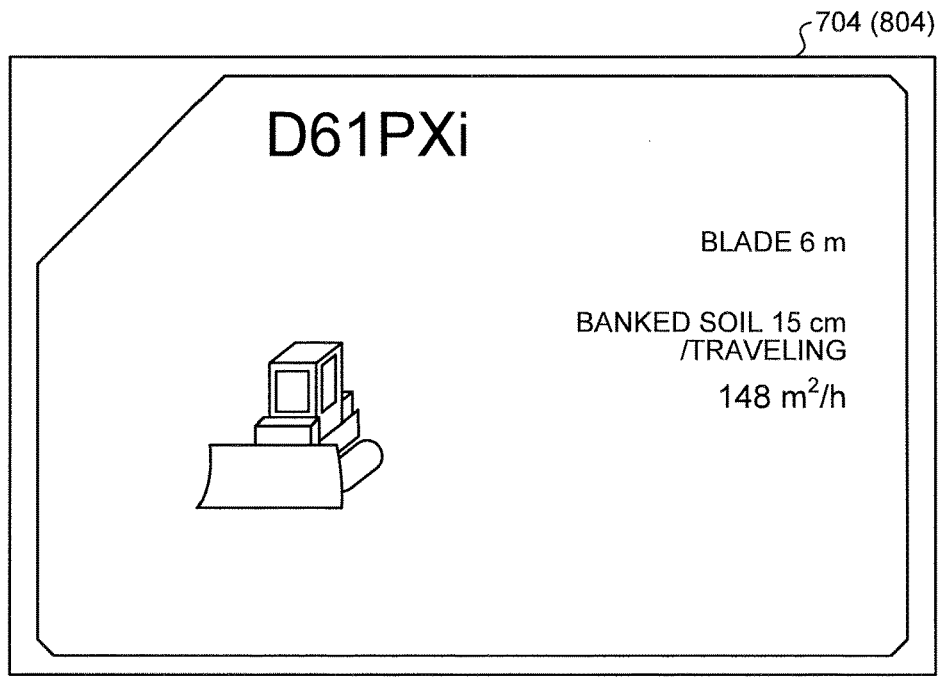
FIG. 15 is a diagram illustrating exemplary output of the output devices according to the present embodiment.
Figure 16:
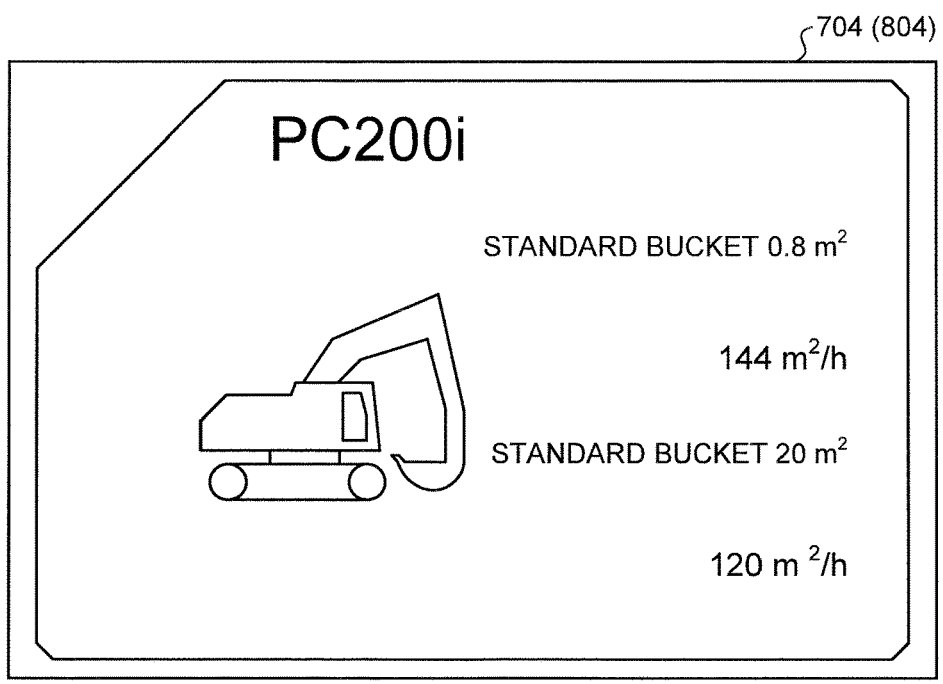
FIG. 16 is a diagram illustrating exemplary output of the output devices according to the present embodiment.

FIG. 15 illustrates exemplary display of the basic unit data of the bulldozer 4A. There is displayed, as the basic unit data of the bulldozer 4A, type or rank (form name) of the bulldozer 4A, blade size, the amount of pressed soil or the amount of banked soil executable per unit time, and the like. FIG. 16 illustrates exemplary display of the basic unit data of the excavator 4B. There are displayed, as the basic unit data of the excavator 4B, type of the excavator 4B, rank (form name), bucket capacity, and the amount of cut soil (the loaded amount, the amount of cut soil, and the amount of banked soil) executable per unit time.

The construction condition data is acquired by the construction condition data acquisition unit 26 (step S80). Further, the variation factor data is acquired by the variation factor data acquisition unit 27 (step S90).

The construction plan data calculation unit 20 calculates the construction plan data based on the current topography data, the design topography data, the basic unit data, the construction condition data, and the variation factor data (step S100). The construction plan data calculation unit 20 simulates the construction and develops optimum construction plan data based on the current topography data, the design topography data, the basic unit data, the construction condition data, and the variation factor data.

The basic unit data includes the size of the working member 440, and thus the amount of soil capable of being cut by the bucket 440B in one cutting operation can be found based on the basic unit data, for example. The number of times of the cutting operations of the bucket 440B required for finishing the current topography into the design topography is found based on differentials between the current topography data and the design topography data. Further, the number of times of the cutting operations of the excavator 4B executable per unit time (the working capability of the excavator 4B) can be also found based on the basic unit data as known data. Therefore, it is possible to calculate which and how many excavators 4B are used for completing the construction within a target construction period. Further, it is possible to find which and how many work machines to use or which workers to employ in the working site based on a constraint condition indicated in the construction condition data.

When soil is carried to be banked from the outside of the construction site 3 to the construction site 3 by use of the transport vehicle 5, if the transport vehicle 5 travels in a local road, a timing to transport soil to the construction site 3 by the transport vehicle 3 or the amount of soil transportable per unit time may change due to traveling route, traveling speed, traffic conditions (such as traffic jam), and the like. For example, when the transport vehicle 5 arrives at the construction site 3 later than a target timing, the construction machine 4 or the worker Ma may have to interrupt its or his/her work until the transport vehicle 5 arrives at the construction site 3. Therefore, it is possible to develop the construction plan data based on the basic unit data for the transport vehicle 5 including a traveling route of the transport vehicle 5, a predicted arrival time to the construction site 3, and the like in order for the works to be efficiently performed.

When the cutting in the construction site 3 is advanced, the soil property may change. Even if a work machine with the same working capability is used, a working speed changes due to the soil property. For example, when cutting clayey soil and when cutting sandy soil, even if a work machine with the same working capability is used, the working speed is lower and the working time is longer when cutting clayey soil than when cutting sandy soil. The soil property is known data capable of being previously found by a preliminary survey such as boring survey. The working speed of the work machine depending on the soil property can be previously found. Therefore, the working time when a work machine is used can be simulated in consideration of the variation factor data including the soil property data.

Construction difficulty (trafficability) changes between rainfall time and sunshine time. A capability of the ground capable of bearing work machine's traveling (a degree of traveling capability) is referred to as trafficability. For example, a mileage maximum speed of the transport vehicle 5 may be lower or the working speed of the construction machine 4 (such as the bulldozer 4A) may be lower in rainfall time than sunshine time. A working speed of the work machine or a mileage maximum speed of the transport vehicle 5 can be also found previously depending on the weather. Therefore, the working time when a work machine is used can be simulated in consideration of the variation factor data including meteorological data. Further, it is possible to develop a construction plan of supplying the construction machine 4 adapted to rainfall or snowfall in the construction site 3 based on the meteorological data. The construction machine 4 adapted to rainfall is the bulldozer 4A with a wide crawler track or the transport vehicle 5 with snowproof tires, which is capable of traveling in a muddy road, for example.

A workable period in which the construction can be performed and an unworkable period in which the construction cannot be performed may be determined based on audits or labor contract in the construction site 3. The schedule data indicating the workable time and the unworkable time is previously-known data, and is stored as the construction condition data in the construction condition database. When the construction condition data is acquired, the construction plan data calculation unit 20 calculates the construction plan data based on the construction condition data including the schedule data.

Process design data indicating working contents and working procedure to be performed for the construction is previously determined, and is stored as the construction condition data in the construction condition database. The construction plan data calculation unit 20 calculates the construction plan data based on the construction condition data including the process design data.

The construction plan data output unit 28 outputs the calculated construction plan data to the portable terminal 7 and the information terminal 8 (step S110). The output device 704 in the portable terminal 7 and the output device 804 in the information terminal 8 display the construction plan data (step S120).

Figures 17, 18:
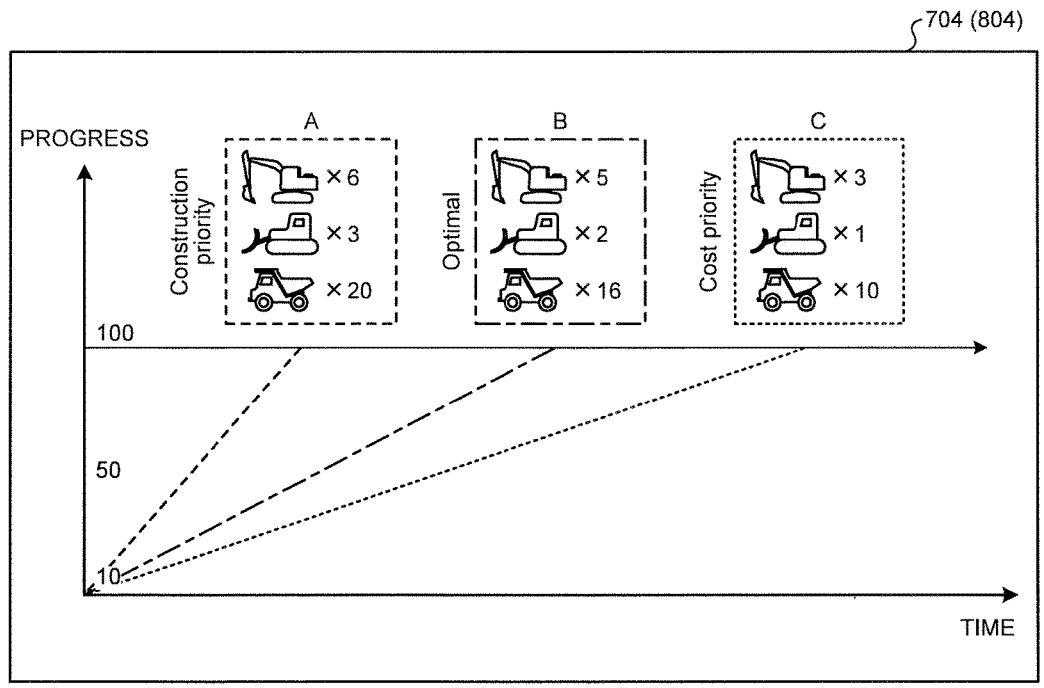
FIG. 17 is a diagram illustrating exemplary output of the output devices according to the present embodiment.
FIG. 18 is a diagram illustrating exemplary output of the output devices according to the present embodiment.
Figure 19:
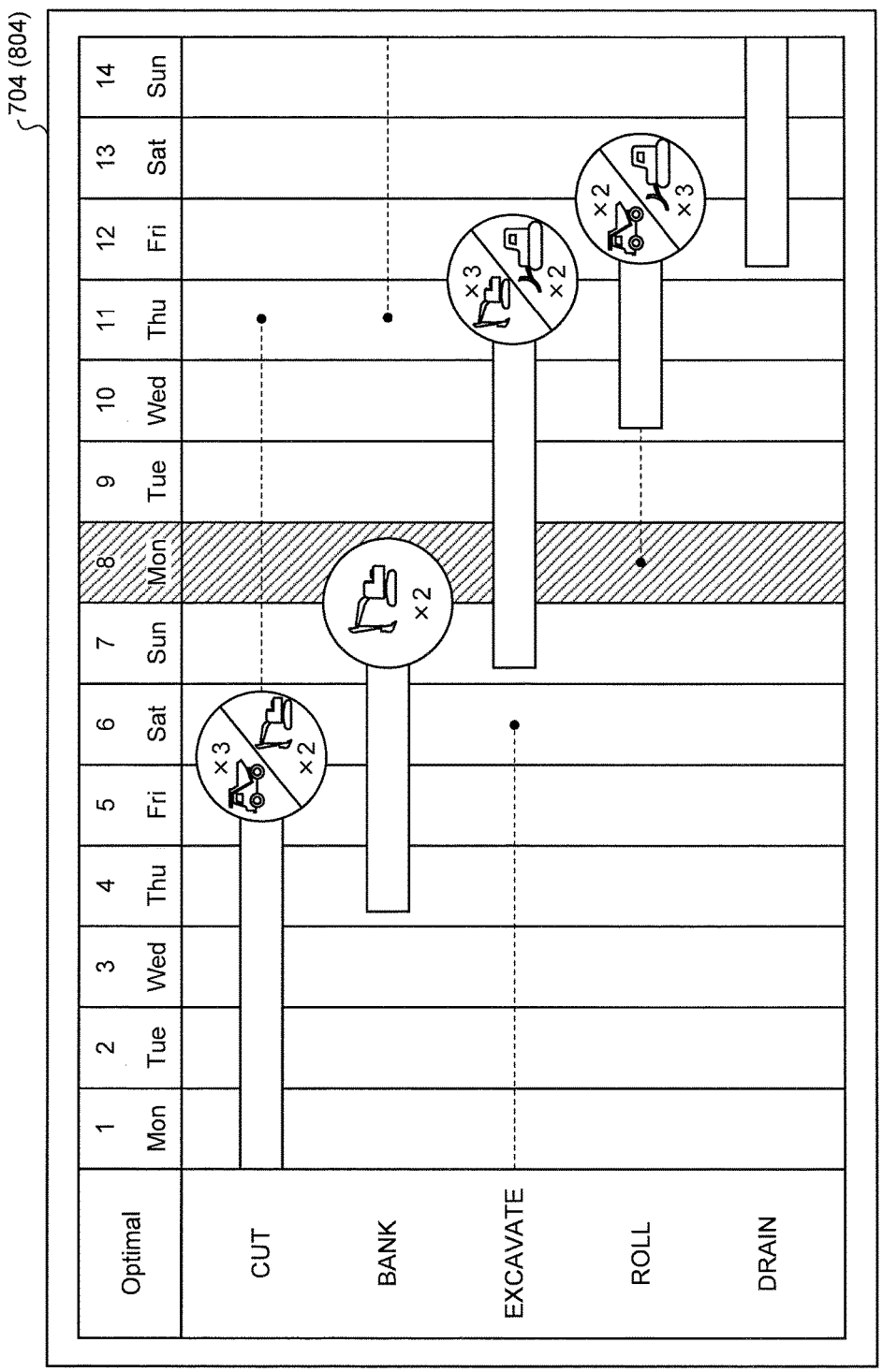
FIG. 19 is a diagram illustrating exemplary output of the output devices according to the present embodiment.

FIG. 17, FIG. 18, and FIG. 19 illustrate exemplary display of the construction plan data on the output device 704 and the output device 804. As illustrated in FIG. 17 and FIG. 18, the work machine data indicating type and quantity of work machines used in the construction site 3 is displayed as the construction plan data. Further, as illustrated in FIG. 17 and FIG. 19, the progress schedule data indicating a progress schedule of the construction by use of work machines is displayed as the construction plan data. As illustrated in FIG. 19, the flow data indicating a working procedure of the construction is displayed as the progress schedule data. As illustrated in FIG. 17 and FIG. 19, the working time data indicating a working time per work of the construction is displayed as the progress schedule data. Further, as illustrated in FIG. 18, the construction period data indicating a period until the construction is completed is displayed as the progress schedule data.

Further, as illustrated in FIG. 18 and FIG. 19, the cost data indicating cost required for the construction is displayed as the construction plan data. According to the present embodiment, the cost data indicates type, rank and quantity of work machines to be used.

Further, as illustrated in FIG. 18, the construction plan data corresponding to the mode data is displayed. The horizontal axis in FIG. 18 indicates a predicted elapsed time from the start of the construction, and the vertical axis indicates a progress of the construction. The construction plan data calculation unit 20 simulates and displays the cost data indicated by type, rank, and quantity of work machines to be used, and the predicted time data between the start of the construction and the end of the construction for a construction period priority mode giving priority to construction period, a cost priority mode giving priority to construction cost, and an intermediate mode for both construction period and cost, respectively. "A" indicated in FIG. 18 indicates the cost data and the predicted time data when the construction period priority mode is selected. "A" indicates that when six excavators 4B are used, three bulldozers 4A are used, and 20 transport vehicles 20 are used, the construction period can be shortened. "C" indicated in FIG. 18 indicates the cost data and the predicted time data when the cost priority mode is selected. "C" indicates that when three excavators 4B are used, one bulldozer 4A is used, and 10 transport vehicles 20 are used, the cost can be restricted but the construction period is prolonged. "B" indicated in FIG. 18 indicates the cost data and the predicted time data when the intermediate mode is selected. "B" indicates that when five excavators 4B are used, two bulldozers 4A are used, and 16 transport vehicles 20 are used, the cost and the construction period take the values between the construction period priority mode and the cost priority mode. In this way, a construction plan data calculation unit 100 can calculate and propose a plurality of patterns of construction plan data to the workers or manager.

The mode data is acquired by the mode data acquisition unit 23 (step S130). That is, the worker Ma operates the input device 703 in the portable terminal 7 or the input device 803 in the information terminal 8 thereby to select any construction plan data from among the construction plan data in three patterns "A", "B", and "C" proposed by the construction planning system 1 and illustrated in FIG. 18.

The input device 703 or the input device 803 is operated so that the mode data indicating priority items of construction is acquired by the mode data acquisition unit 23 via Internet, for example.

The mode data is selected, and accordingly the construction plan is determined (step S140).

The construction planning system 1 can calculate the progress schedule data based on the selected construction plan, and can automatically prepare the work machines for a management company holding the work machines, operators of the work machines, a work machine rental company, and the like. Thereby, the construction can be started earlier in the construction site.

The progress schedule data illustrated in FIG. 19 will be described. For example, there is illustrated a plan in which three transport vehicles 5 and two excavators 4B are carried into the construction site in the period between the first day and the sixth day for the cutting process. Further, there is illustrated a plan in which two excavators 4B are carried into the construction site in the period between the fourth day and the eighth day for the banking process. In this way, according to the progress schedule data, it is possible to visually and easily grasp how many construction machines 4 or transport vehicles 5 are required for which process in which period.

The construction is started based on the determined construction plan in the construction site 3 (step S150). The design topography data and the construction plan data are transmitted from the construction plan data output unit 28 to the construction machine 4. The construction machine 4 carries out the construction in the construction site 3 while controlling the working member 440 based on the design topography data. Thereby, even the construction machine 4 operated by an inexperienced operator can carry out the high-accuracy construction as in the design drawing. The construction machine 4 operated by an experienced operator remarkably enhances productivity.

The construction performance data is transmitted from the construction machine 4 in operation to the computer system 2 in real-time, for example. The construction performance data may be transmitted from the construction machine 4 to the computer system 2 at fixed intervals per day or periodically, for example. The construction performance data acquisition unit 21 acquires the working performance data of the construction machine 4 (step S160).

As described with reference to FIG. 5 and FIG. 6, the construction machine 4 can detect an absolute position of the blade edge 440$p$ contacting on the current topography. The construction machine 4 acquires an absolute position in the Xg axis direction, an absolute position in the Yg axis direction, and an absolute position in the Zg axis direction at each mesh point based on the absolute position of a blade edge 400$p$, thereby detecting the current topography.

Figure 20:
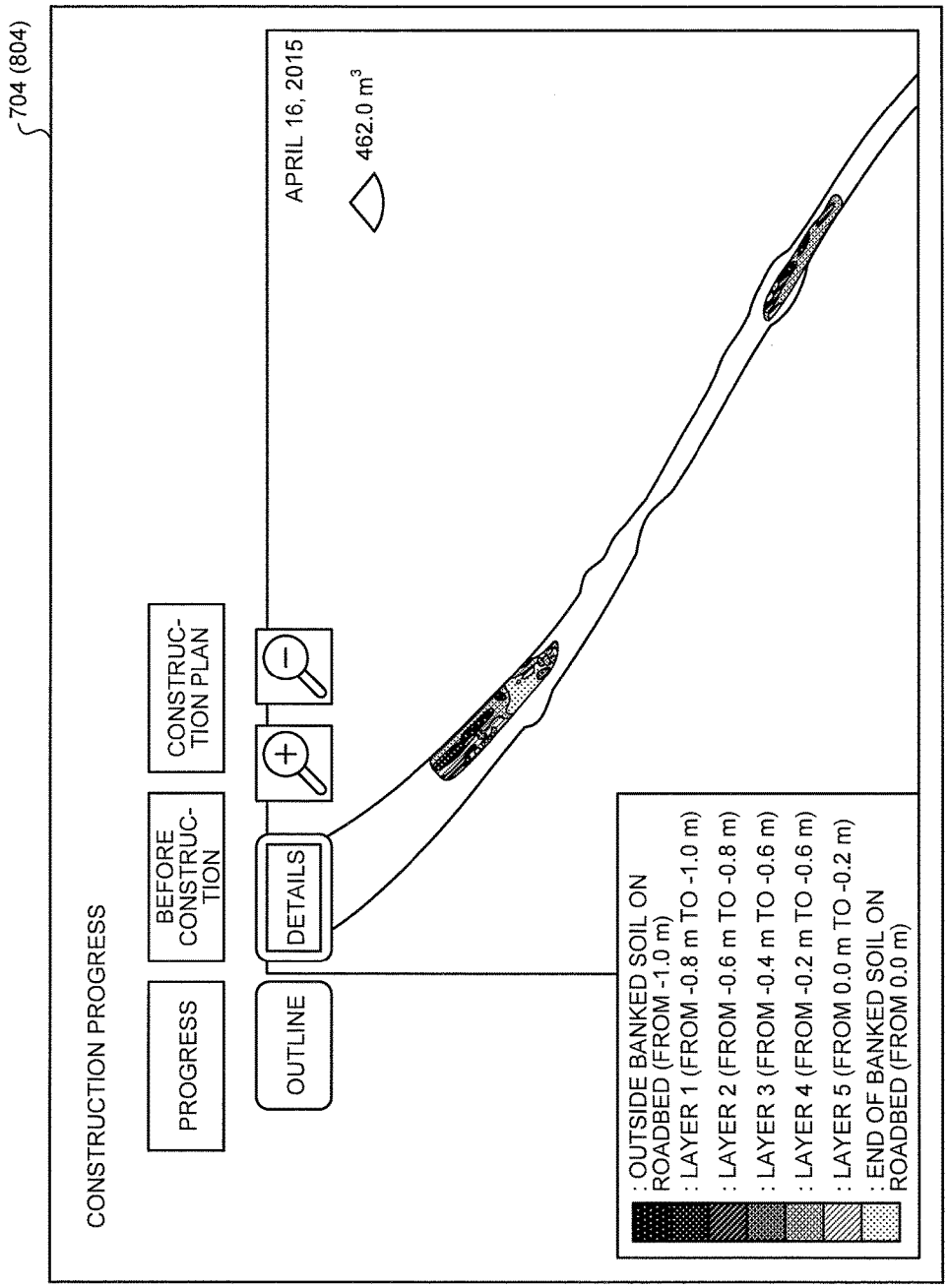
FIG. 20 is a diagram illustrating exemplary output of the output devices according to the present embodiment.
Figure 21:
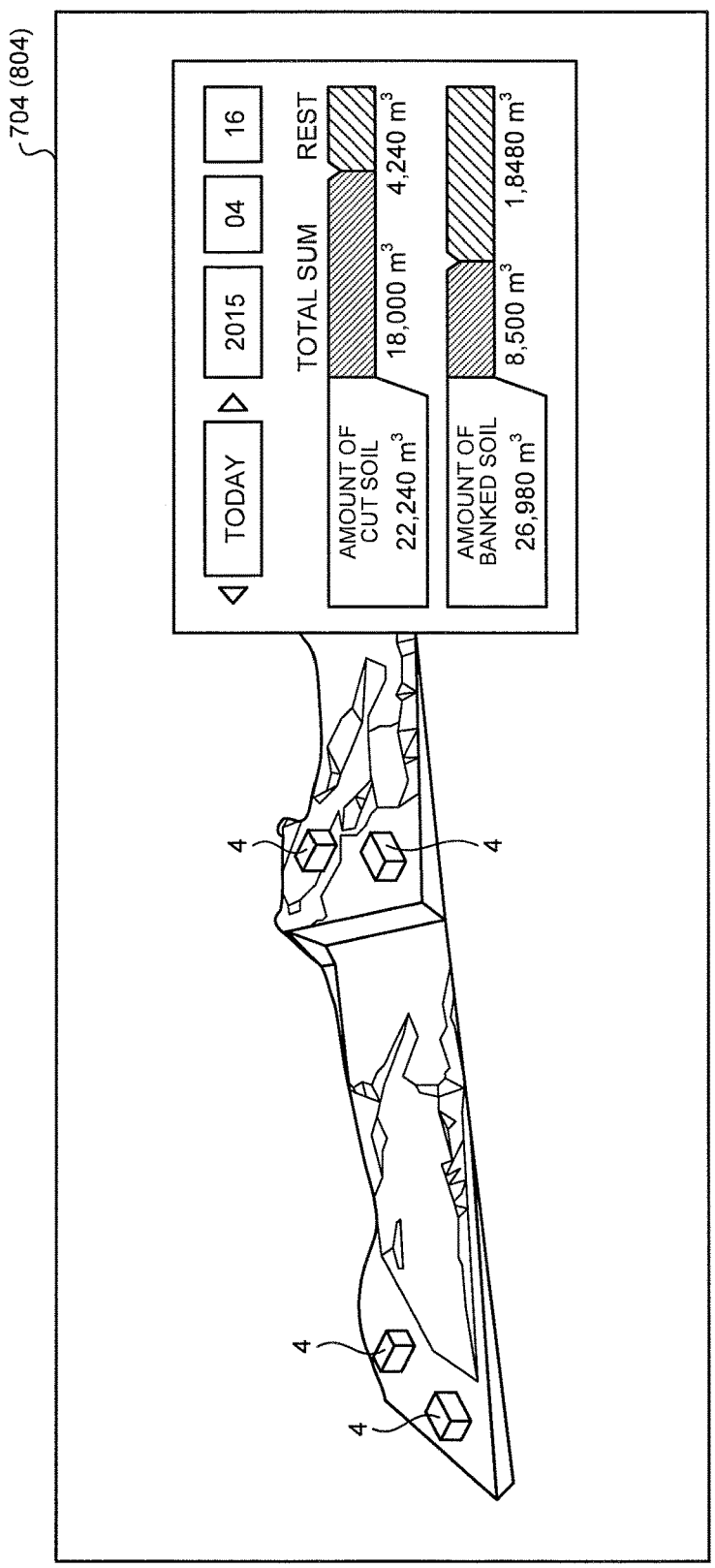
FIG. 21 is a diagram illustrating exemplary output of the output devices according to the present embodiment.

The position data at each mesh point is output to the construction performance data acquisition unit 21. The output device 704 in the portable terminal 7 and the output device 804 in the information terminal 8 display the construction performance data (step S170). FIG. 20 illustrates exemplary display of the construction performance data, which is a 2D-displayed example. FIG. 21 illustrates a 3D-displayed example. In this way, the worker can visually confirm the daily construction performance (volume) in real-time. That is, the construction planning system 1 can always "visualize" daily construction plan and construction performance.

The exemplary construction performance data illustrated in FIG. 20 will be described. A construction progress at a certain point of time (Apr. 16, 2015, for example) in a construction site is two-dimensionally displayed. In the construction site, soil is banked. Situations in which soil is banked on the roadbed several times (in several layers) are visualized in colors or patterns. The total sum of banked soil is numerically displayed (462.0 m³ in FIG. 20, for example). When the button "before construction" is selected, the states before the construction are displayed in colors or patterns, and when the button "construction plan" is selected, the states of the construction plan are displayed in colors or patterns. With such 2D display, the construction progress can be visually and easily grasped.

The exemplary construction performance data illustrated in FIG. 21 will be described. A construction progress at a certain point of time (Apr. 16, 2015, for example) in a construction site is three-dimensionally displayed. The current topography is three-dimensionally displayed with light and dark. The computer system 2 acquires the absolute position data indicating an absolute position of the vehicle by the GPS receiver 406B provided on the construction machine 4 from each construction machine 4, and visually displays the position of the construction machine 4 in the construction site. Further, as a result of the works so far, the target amount of cut soil (22,240 m³, for example) and the target amount of banked soil (26,980 m³) are numerically displayed, and the respective accumulative amounts (total sums) and the respective remaining amounts relative to the target amounts are displayed in numerals or bar graphs. With such 3D display, the construction progress can be visually and easily grasped.

The construction plan and the construction performance are "visualized", thereby rapidly circulating a so-called PCDA (Plan Do Check Action) capable of rapidly performing a series of works including construction planning before construction, construction conduction during construction, and construction evaluation.

When the design topography is desired to change in the construction site 3, support is provided by the support center 14. The design topography data is corrected and reflected on the process management in the support center 14.

Further, the design plan data and the construction performance data are accumulated in the result database 34. The current topography data, the design topography data, the basic unit data, the construction performance data, the variation factor data, and the mode data may be accumulated in the result database 34. The data accumulated in the result database 34 may be utilized for conditioning, fixing, future maintenance, recovery works in areas affected in natural disasters, and the like also after the completed construction, which contributes to a remarkable reduction in processes.

Effects

As described above, according to the present embodiment, the construction planning system 1 has the current topography data acquisition unit 22, the design topography data acquisition unit 24, the basic unit data acquisition unit 25, and the construction plan data calculation unit 20, and thus the construction plan data calculation unit 20 can derive a construction range to be constructed, and the construction amount based on the current topography data and the design topography data. The construction planning system 1 uses the construction plan data calculation unit 20 in the computer system 2 thereby to develop an optimum construction plan based on the derived construction range and construction amount as well as the basic unit data. Thereby, productivity in the construction site can be enhanced, and the issue of the shortage of workers in the construction industry can be solved.

According to the present embodiment, (1) an accurate construction plan can be made before construction and during construction, (2) differentials between the plan and the performance (completion/volume) can be grasped in real-time, (3) an optimum construction procedure and schedule can be proposed, and (4) a construction plan can be calculated while predicting an occurrence of a variation factor. Thereby, the productivity in the construction site 3 can be remarkably enhanced.

According to the present embodiment, the construction planning system 1 can support all the construction works in the construction company 12 and the construction site 3 before construction, during construction, after construction, and in maintenance management.

According to the present embodiment, the construction plan data is transmitted from the construction plan data output unit 28 to the portable terminal 7 and the information terminal 8 functioning as the first output device. Thereby, the portable terminal 7 and the information terminal 8 can display the construction plan data. Therefore, the worker Ma in the construction site 3 can sufficiently grasp the construction plan visually.

According to the present embodiment, the portable terminal 7 and the information terminal 8 three-dimensionally display the current topography data and the design topography data. Thereby, the worker Ma can intuitively grasp differentials between the current topography and the design topography.

According to the present embodiment, the camera 11 functioning as the first detector detects the current topography in a non-contact manner, and wirelessly transmits the current topography data to the current topography data acquisition unit 22 in the computer system 2. Thereby, the current topography can be rapidly surveyed and the survey result can be rapidly transmitted.

According to the present embodiment, the camera 11 is mounted on the drone 10 as an unmanned flight vehicle to survey the current topography from the sky. Thereby, the survey can be completed in a short time.

According to the present embodiment, the conditions of work machine indicated by the basic unit data include at least one of type or rank of work machine, quantity of work machines, and management state of work machine. Thereby, a construction simulation accuracy can be enhanced and an optimum construction plan can be developed based on the basic unit data.

According to the present embodiment, the conditions of work machine indicated by the basic unit data include the working amount of the work machine executable per unit time. Thereby, a construction simulation can be made at a high accuracy per unit time or per process.

According to the present embodiment, the work machine has a working member capable of changing the current topography, and the working amount includes a size of the working member. The size of the working member is fixed data capable of being previously known, thereby alleviating a load of calculating the working amount.

According to the present embodiment, the work machine includes a transport vehicle for transporting soil to the construction site, and the working amount includes the amount of soil transportable per unit time. The amount of soil transportable per unit time changes depending on a traveling condition (traveling route, traveling distance, and traveling speed) of the transport vehicle 5 traveling in a local road, traffic conditions, a size of the vessel, and the like. The construction simulation accuracy is enhanced and optimum construction plan data can be calculated in consideration of the traveling conditions of the transport vehicle 5, the traffic conditions, the size of the vessel, and the like. For example, when soil needs to be filled in the construction site 3 but the transport vehicle 5 mounting soil thereon is late to arrive at the construction site 3 due to traffic conditions, the construction can be stopped. In order to prevent such a situation, the construction plan data is calculated based on the conditions of the transport vehicle 5, and thus the productivity in the construction site 3 can be enhanced.

According to the present embodiment, the basic unit data further includes the conditions of workers in the construction site. The productivity in the construction site 3 depends on not only the work machines but also the workers. Thus, the construction plan is calculated in consideration of the conditions of workers, thereby enhancing the productivity in the construction site 3.

According to the present embodiment, the conditions of workers include at least one of the number of workers and the skills of workers. Thereby, the construction simulation accuracy is enhanced and an optimum construction plan is developed.

According to the present embodiment, the construction plan data calculation unit 20 collates the current topography data with the design topography data thereby to calculate the construction range data indicating a construction range in the construction site and the soil amount data indicating the cut amount or the filled amount of soil required in the construction range, and calculates the construction plan data based on the construction range data and the soil amount data as well as the basic unit data. Thereby, optimum construction plan data can be calculated, and the productivity in the construction site 3 can be enhanced.

According to the present embodiment, the construction plan data includes at least one of the work machine data indicating type or rank and quantity of work machines used in the construction site, the progress schedule data indicating a progress schedule of the construction using the work machines, and the cost data indicating cost required for the construction. The work machine data, the progress schedule data, and the cost data are calculated so that the actual construction can be smoothly performed and the productivity is enhanced.

According to the present embodiment, the progress schedule data includes at least one of the flow data indicating a construction working procedure, the working time data indicating a working time per work of the construction, and the construction period data indicating a period until the construction is completed. Thereby, the worker Ma can smoothly perform the works according to the data.

According to the present embodiment, there is provided the construction condition data acquisition unit 26 configured to acquire the construction condition data indicating construction conditions of the construction site, and the construction plan data calculation unit 20 calculates the construction plan data based on the construction condition data. The construction conditions as initial conditions or constraint conditions are defined so that a solution can be rapidly and accurately obtained in the construction simulation and optimum construction plan data can be calculated.

According to the present embodiment, the construction condition data includes at least one of budget, construction period, working contents, working procedure, working time, and site environments for the construction. A construction simulation is made while the budget and the construction period are defined, thereby appropriately proposing a plurality of construction plans within the budget and the construction period. The working contents, the working procedure and the working time are previously defined, thereby calculating proper construction plan data under a proper labor environment and acquiring a targeted construction result.

According to the present embodiment, the site environments include at least one of a topography of the construction site and a size of the construction site. A time required for the works changes depending on the topography and size of the construction site. Therefore, the topography and size of the construction site are set, thereby enhancing the construction simulation accuracy.

According to the present embodiment, there is provided the variation factor data acquisition unit 27 configured to acquire the variation factor data indicating variation factors in the construction site, and the construction plan data calculation unit 20 calculates the construction plan data based on the variation factor data. The variation factor data includes at least one of the soil property data indicating type and state of soil in the construction site, the deposit data indicating deposits under the construction site 3, and the meteorological data of the construction site 3. A time required for the works changes depending on the soil property in the construction site. For example, a time required for various works such as cutting work, pressing work, banking work, cutting work, leveling work and loading work by the construction machine 4 changes depending on heavy soil, light soil, clayey soil, and sandy soil. Further, trafficability of the transport vehicle 5 changes and a time required for transportation by the transport vehicle 5 also changes due to the soil property. A time required for the works by the work machine changes between sunshine time and rainfall time. The construction simulation accuracy can be further enhanced and proper construction plan data can be calculated in consideration of the variation factors due to natural phenomena.

According to the present embodiment, the support center 14 configured to accept changes in the design topography is provided, the design topography data acquisition unit 24 acquires the changed design topography data output from the support center 14, and the construction plan data calculation unit 20 recalculates the construction plan data based on the changed design topography data. Loads in the construction site 3 can be alleviated and the determination for the construction site 3 can be accurately reflected on the construction by the support center 14.

As illustrated in the present embodiment, there may be provided the remote control unit 29 configured to output a control signal for remotely controlling the work machine based on the changed design topography data. Thereby, loads on the operator of the work machine are alleviated, and the computerized construction can be performed according to the changed design topography data.

According to the present embodiment, there is provided the construction performance data acquisition unit 21 configured to acquire the construction performance data indicating construction performances in the construction site 3, and the construction plan data calculation unit 20 recalculates the construction plan data based on the construction performance data. Thereby, an optimum construction plan can be developed based on a progress of the construction each time.

According to the present embodiment, the construction performance data is displayed on the portable terminal 7 and the information terminal 8 functioning as the second output device. Thereby, the worker can grasp a daily construction progress.

According to the present embodiment, the work machine acquires the construction performance data, and the construction performance data acquisition unit 21 wirelessly acquires the construction performance data 21 from the work machine. Thereby, the construction performance can be rapidly grasped in real-time.

According to the present embodiment, there is provided the mode data acquisition unit 23 configured to acquire the mode data indicating priority items of construction, and the construction plan data calculation unit 20 calculates the construction plan data based on the mode data. Thereby, when a plurality of patterns of construction plans are proposed by the construction plan data calculation unit 20, the worker or the manager only operates the input device to transmit the mode data to the mode data acquisition unit 23, thereby acquiring a construction plan based on a priority item.

According to the present embodiment, the mode data includes at least one of the construction period priority mode data giving priority to a construction period and the cost priority mode data giving priority to construction cost. Construction period and cost are set as the priority items, a construction plan based on the budget and the target construction period can be selected.

According to the present embodiment, it is assumed that the drone 10 having a power source is used as a flight vehicle to acquire the current topography data. As a flight vehicle, a model airplane may be employed or a balloon without a power source may be employed. The current topography may be detected by a camera mounted on a balloon.

Variant of Acquisition of Current Topography Data

As described with reference to FIG. 2 to FIG. 6, the construction machine 4 has the vehicle main body 400, and the working member 440 relatively moving relative to the vehicle main body 400. The working member 400 has the blade edge 400*p* contacting on the current topography. The construction machine 4 has the processor 401 (the blade controller 401A, the bucket controller 401B) configured to detect the current topography based on an absolute position of the blade edge 440*p*. An absolute position of the vehicle main body 400 is detected by the GPS receiver 406. The construction machine 4 includes the detector 420 (420A, 420B) configured to detect a relative position of the blade edge 440*p* relative to the vehicle main body 400. The absolute position of the blade edge 440*p* is found based on the absolute position of the vehicle main body 400 and the detection result of the detector 420. The construction site 3 is constructed by the blade edge 440*p* so that the current topography is formed. That is, the absolute position of the blade edge 440*p* is known, and accordingly the absolute position of the mesh point on the surface of the current topography is known. Therefore, the processor 401 detects the absolute position of the blade edge 440*p* thereby to detect the current topography.

The processor 401 in the construction machine 4 wirelessly transmits the current topography data to the computer system 2. The current topography data acquisition unit 22 in the computer system 2 wirelessly acquires the current topography data from the construction machine 4.

In this way, the current topography data is acquired by use of not only a flight vehicle such as the drone 10 but also the construction machine 4. For example, when an obstacle such as tree is present in the construction site 3 and the drone 10 is difficult to fly, the construction machine 4 is used thereby to smoothly acquire the current topography data.

The 3D current topography data may be detected by a stereo camera mounted on the construction machine 4. With the stereo camera mounted on the construction machine 4, the current topography data can be accurately acquired as a result of the construction by the construction machine 4, and the current topography data can be accurately acquired even from the area where the drone 10 is difficult to fly or the current topography data cannot be acquired by the drone 10 as described above. In this way, the current topography data may be acquired by use of both the drone 10 and the stereo camera. The stereo camera may be installed in the construction site to be movable.

Alternatively, there may be used a 3D laser scanner configured to optically acquire the current topography data by irradiating a laser light as a detection light on the surface of the current topography in order to acquire the 3D current topography data. Further, a triangulation device may be used for acquiring the 3D current topography data.

According to the present embodiment, there has been mainly described the example in which the output device 704 and the output device 804 are the display devices. The output device 704 and the output device 804 may be printers. That is, the image data illustrated in FIG. 13 to FIG. 21 may be printed as printed materials.

There has been described above, in the above embodiment, the example in which the construction machine 4 is an ICT construction machine. If the current topography data is acquired by the first detector such as drone, stereo camera, and 3D laser scanner each time, a construction plan (construction plan data) can be presented to the manager or worker by the construction planning system using not the ICT construction machine but a typical construction machine not mounting thereon a device enabling computerized construction.

According to the aspects of the present invention, the construction planning system capable of enhancing productivity in construction sites can be provided.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A construction planning system including a computer system capable of data communication via communication line between various devices arranged in a construction site and an information terminal, wherein the computer system comprising:

a current topography data acquisition unit configured to acquire current topography data indicating a current topography of the construction site;

a design topography data acquisition unit configured to acquire design topography data indicating a design topography of the construction site from the information terminal;

a basic unit database configured to store basic unit data indicating conditions of at least one procurable work machine for carrying out a construction in the construction site;

a construction plan data calculation unit configured to calculate construction plan data indicating a construction plan of the construction site based on the current topography data, the design topography data, and the basic unit data; and a construction plan data output unit configured to output the construction plan data to at least the information terminal via the communication line, wherein the construction plan data calculation unit processes the current topography data and the design topography data into 3D image data, the construction plan data calculation unit calculates the 3D image data of construction range data indicating a construction range in the construction site by collating the current topography data with the design topography data, and the construction plan data output unit outputs the 3D image data via the communication line.

2. The construction planning system according to claim 1, wherein the 3D image data is displayed so that an area requiring cut soil in the construction range is distinguishable from an area requiring filled soil in the construction range.

3. The construction planning system according to claim 1, wherein the construction plan data calculation unit further calculates soil amount data indicating at least one of: an amount of cut soil; and an amount of filled soil; in the construction range, and the construction plan data output unit outputs the 3D image data, and the soil amount data as numerical data, via the communication line.

4. The construction planning system according to claim 1, wherein the current topography data includes the data acquired by at least one of: an image capture device capable of imaging the current topography of the construction site; a 3D laser scanner; and a triangulation device.

5. The construction planning system according to claim 4, wherein the image capture device includes a camera provided on a flight vehicle.

6. The construction planning system according to claim 1, wherein the current topography data includes the data acquired on the basis of at least one of: a position of a blade edge of a working member; and a position of a traveling device; of a work machine arranged in the construction site.

7. The construction planning system according to claim 1, wherein conditions of the work machine include at least one of type of the work machine, quantity of the work machines, and a management state of the work machine.

8. The construction planning system according to claim 1, wherein the conditions of the work machine include a working amount of the work machine executable per unit time.

9. The construction planning system according to claim 1, wherein the construction plan data includes at least one of work machine data indicating type and quantity of the work machines used in the construction site, progress schedule data indicating a progress schedule of the construction using the work machine, and cost data indicating cost required for the construction.

10. The construction planning system according to claim 9, wherein the progress schedule data includes at least one of flow data indicating a working procedure of the construction, working time data indicating a working time per work of the construction, and construction period data indicating a period until the construction is completed.

11. The construction planning system according to claim 1, comprising:

a construction condition data acquisition unit configured to acquire construction condition data indicating construction conditions of the construction site, wherein the construction plan data calculation unit calculates the construction plan data based on the construction condition data.

12. The construction planning system according to claim 1, comprising:

a variation factor data acquisition unit configured to acquire variation factor data indicating variation factors of the construction site, wherein the construction plan data calculation unit calculates the construction plan data based on the variation factor data.

13. The construction planning system according to claim 12, wherein the variation factor data includes soil property data indicating type and state of soil in the construction site.

14. The construction planning system according to claim 1, comprising:

a construction performance data acquisition unit configured to acquire construction performance data indicating construction performances of the construction site, wherein the construction plan data calculation unit recalculates the construction plan data based on the construction performance data.

15. The construction planning system according to claim 1, comprising:

a mode data acquisition unit configured to acquire mode data indicating priority items of the construction, wherein the construction plan data calculation unit calculates the construction plan data based on the mode data.

16. The construction planning system according to claim 15, wherein the mode data includes construction period priority mode data giving priority to a period of the construction and cost priority mode data giving priority to cost of the construction.

* * * * *